(12) United States Patent
Kim et al.

(10) Patent No.: US 9,665,124 B2
(45) Date of Patent: May 30, 2017

(54) WEARABLE DEVICE AND METHOD OF CONTROLLING THE SAME

(71) Applicant: LG ELECTRONICS INC., Seoul (KR)

(72) Inventors: Hyeonhui Kim, Seoul (KR); Jinhee Lee, Seoul (KR); Guang Jang, Seoul (KR); Yuvin Ha, Seoul (KR); Jungdo Kim, Seoul (KR); Sinae Chun, Seoul (KR); Changshik Shin, Seoul (KR); Myeongsoo Shin, Seoul (KR); Sangbum Ha, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 14/464,164

(22) Filed: Aug. 20, 2014

(65) Prior Publication Data

US 2015/0348495 A1 Dec. 3, 2015

(30) Foreign Application Priority Data

Jun. 2, 2014 (KR) .......................... 10-2014-0067105

(51) Int. Cl.
*G09G 5/00* (2006.01)
*G06F 3/0484* (2013.01)
*G06F 1/16* (2006.01)
*G09G 5/36* (2006.01)

(52) U.S. Cl.
CPC ............ *G06F 1/163* (2013.01); *G06F 3/0484* (2013.01); *G09G 5/00* (2013.01); *G09G 2320/0606* (2013.01); *G09G 2330/022* (2013.01); *G09G 2340/0407* (2013.01); *G09G 2340/0464* (2013.01); *G09G 2340/14* (2013.01); *G09G 2354/00* (2013.01)

(58) Field of Classification Search
CPC combination set(s) only.
See application file for complete search history.

(56) References Cited

U.S. PATENT DOCUMENTS

| 2012/0032979 A1* | 2/2012 | Blow | G06F 1/1626 345/647 |
| 2013/0234948 A1* | 9/2013 | Jian | G06F 3/0487 345/169 |
| 2013/0254705 A1* | 9/2013 | Mooring | G06F 3/0488 715/784 |

* cited by examiner

*Primary Examiner* — Srilakshmi K Kumar
*Assistant Examiner* — Jeffrey S Steinberg
(74) *Attorney, Agent, or Firm* — Birch, Stewart, Kolasch & Birch, LLP

(57) ABSTRACT

Disclosed are a wearable device and method of controlling the same, which output more suitable image information on the basis of a state in which the wearable device is covered. The wearable device includes a wearable device body, a display unit provided in the wearable device body, a sensing unit included in the wearable device body, and configured to sense a region, in which the display unit is covered by an object, and a region in which the display unit is not covered, and a control unit configured to display first image information in a predetermined first region when the region in which the display unit is not covered corresponds to the predetermined first region, and display second image information in a predetermined second region when the region in which the display unit is not covered corresponds to the predetermined second region, as a result in which a portion of the display unit is covered by the object.

17 Claims, 15 Drawing Sheets

(a)  (b)

(a)　　　　　　　　　　　(b)

(c)　　　　　　　　　　　(d)

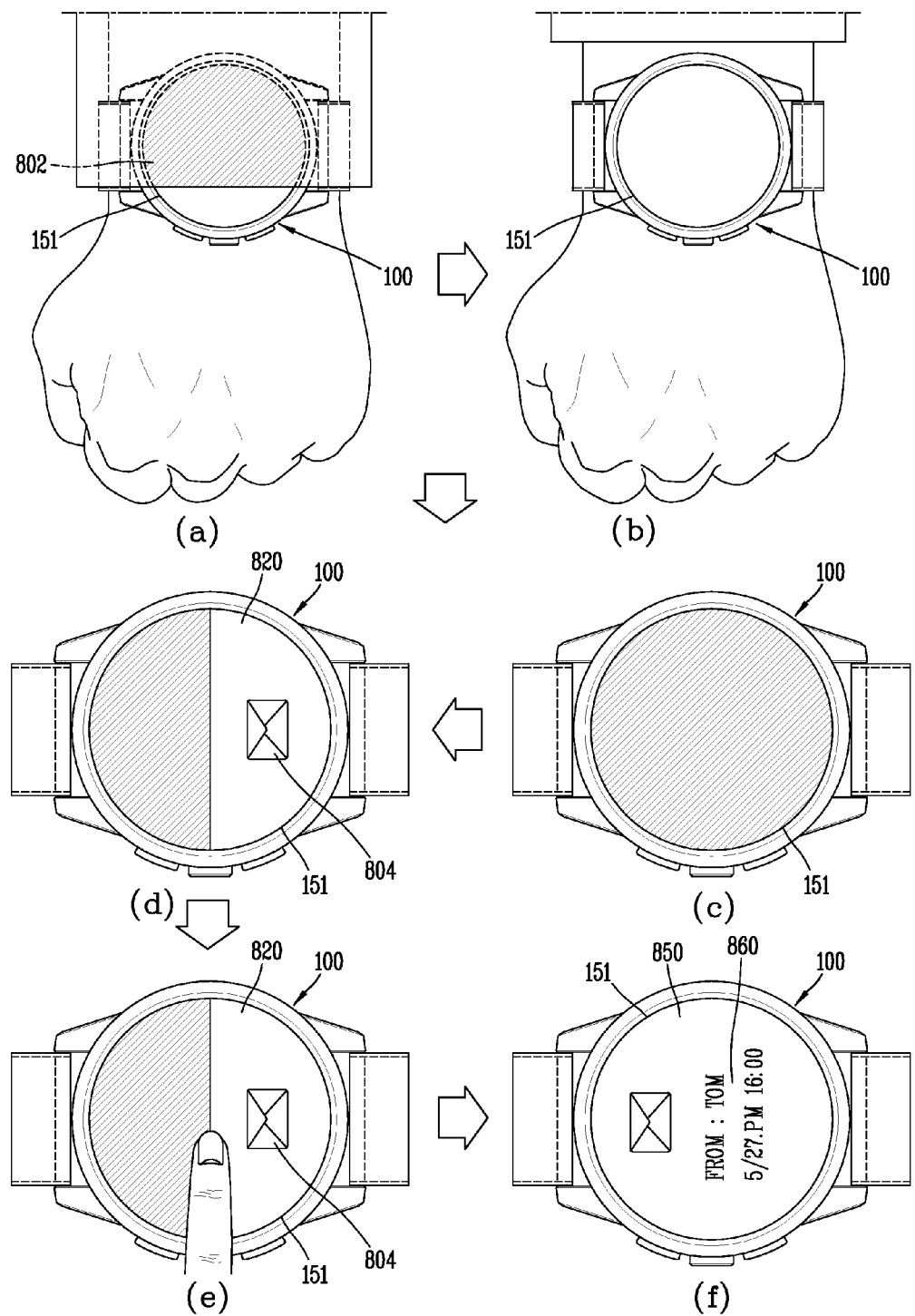

(a)

(b)

(a)

(b)

WEARABLE DEVICE AND METHOD OF CONTROLLING THE SAME

CROSS-REFERENCE TO RELATED APPLICATION

Pursuant to 35 U.S.C, §119(a), this application claims the benefit of earlier filing date and right of priority to Korean Application No. 10-2014-0067105, filed on Jun. 2, 2014, the contents of which is incorporated by reference herein in its entirety.

BACKGROUND OF THE DISCLOSURE

1. Field of the Disclosure

The present disclosure relates to a wearable device and method of controlling the same, which output more suitable image information on the basis of a state in which the wearable device is covered.

2. Background of the Disclosure

Wearable devices include various kinds of electronic devices which are wearable on a body or clothes of a user. For example, the wearable devices may include smart watches, wearable computers, google glasses, Bluetooth headsets, smart wears, etc.

As described above, the wearable devices are wearable on a body or clothes of a user. Therefore, the wearable devices are sometimes covered by a user's clothes. To solve such a problem, research is being actively done in which a user interface (UI) is provided depending on a state where a wearable device is covered.

SUMMARY OF THE DISCLOSURE

Therefore, an aspect of the detailed description is to provide a wearable device and method of controlling the same, which provide a more suitable UI depending on a state in which the wearable device is covered.

Another aspect of the detailed description is to provide a wearable device and method of controlling the same, which provide one of a plurality of predetermined UIs on the basis of a state in which the wearable device is covered.

Another aspect of the detailed description is to provide a wearable device and method of controlling the same, which maintains a UI, which displays image information in a predetermined specific region, when a region in which a portion of the wearable device is covered is changed within a certain level.

To achieve these and other advantages and in accordance with the purpose of this specification, as embodied and broadly described herein, a wearable device includes: a wearable device body; a display unit provided in the wearable device body; a sensing unit included in the wearable device body, and configured to sense a region, in which the display unit is covered by an object, and a region in which the display unit is not covered; and a control unit configured to display first image information in a predetermined first region when the region in which the display unit is not covered corresponds to the predetermined first region, and display second image information in a predetermined second region when the region in which the display unit is not covered corresponds to the predetermined second region, as a result in which a portion of the display unit is covered by the object, wherein, the region in which the display unit is covered is changed in a state where the first image information is displayed in the predetermined first region, and when the region in which the display unit is covered includes at least one portion of a predetermined threshold region, the control unit maintains a state in which the first image information is displayed in the predetermined first region, and the second image information includes information associated with the first image information.

When there is a user's selection or a predetermined condition is satisfied, the control unit may again determine a size and a position of the predetermined threshold region. The predetermined condition may include a case, in which a region of the display unit having a predetermined size or more is continuously covered for a certain time or more, or a case in which a frequency number, in which a size of the region where the display unit is covered is changed by equal to or more than a certain level, is equal to or more than predetermined number of times.

When a specific event predetermined by the user occurs, or a specific function predetermined by the user is performed, the control unit may determine there to be the user's selection.

The control unit may determine the size of the position of the predetermined threshold region, based on a result in which the size of the region where the display unit is covered is measured for a predetermined time.

The control unit may measure the region, in which the display unit is covered, in units of a certain time for the predetermined time, calculate an average region of a plurality of the measured regions, and set the predetermined threshold region with respect to a region limit of the average region.

The control unit may measure the region, in which the display unit is covered, in units of a certain time for the predetermined time, calculate an average region of a plurality of regions which include an entirety of a predetermined region and an average region of a plurality of regions which do not include the entirety of the predetermined region, among a plurality of the measured regions, and set the predetermined threshold region, based on region limits of the average regions.

The control unit may further determine a motion state of the user, based on a position movement state of the wearable device body, and adjusts the size of the predetermined threshold region, based on the determined motion state of the user.

As number of motions of the user increases, the control unit may allow the size of the predetermined threshold region to further increase, based on a determination result of the motion state. The size of the predetermined threshold region may be adjusted with respect to a reference line which is predetermined in the predetermined threshold region.

The control unit may further determine a posture of the user, based on a result in which a horizontal state of the wearable device body is sensed, and adjust the size of the predetermined threshold region, based on the determined posture of the user.

The second region may be a larger-size region which includes the predetermined first region.

Based on a sensing result of the region in which the display unit is covered, when the covered region does not include the predetermined threshold region, the control unit may display the second image information in the display unit.

When the display unit is covered by equal to or more than a predetermined level, the control unit may enter a sleep mode in which an entire region of the display unit switches to an inactive state.

In the sleep mode, when the region in which the display unit is covered is changed, the control unit may display the first image information in the predetermined first region, and display the second image information in the predetermined second region, based on a user's selection for the first image information.

The first image information may include notification information for displaying an event which occurs in the wearable device, and the second image information may include information about various functions which are associated with the event and are able to be performed in the wearable device.

When there is a user's touch input for image information which is displayed in the predetermined second region, the control unit may perform a function associated with the notification information.

In a state of performing a function associated with the notification information, when the region in which the display unit is covered is changed, the control unit may control performing of the function associated with the notification information, based on the size of the region in which the display unit is covered.

The control unit may maintain, in an inactive state, a region of the display unit other than the predetermined first region or the predetermined second region.

When the display unit is covered by the object which is located within a predetermined distance, the control unit may sense a covered region.

The control unit may determine a position of the predetermined threshold region, a position of the predetermined first region, and a position of the predetermined second region, based on a direction of the region in which the display unit is covered.

According to another aspect of the present invention, a method of controlling a wearable device includes: detecting a region in which a display unit provided in the wearable device is covered by an object; displaying first image information in a predetermined first region or displaying second image information in a predetermined second region, based on the detected region; sensing a change of the region in which the display unit is covered; when the covered region is changed, determining whether the changed region includes at least one portion of a predetermined threshold region; and maintaining a state in which image information is currently displayed, or switching to a state in which other image information is displayed in another region, according to whether the changed region includes the at least one portion of the predetermined threshold region, wherein the second image information includes information associated with the first image information.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 8A to 8C are exemplary diagrams illustrating examples in which a UI is changed based on a region where the smart watch according to an embodiment of the present invention is covered and a predetermined threshold region;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
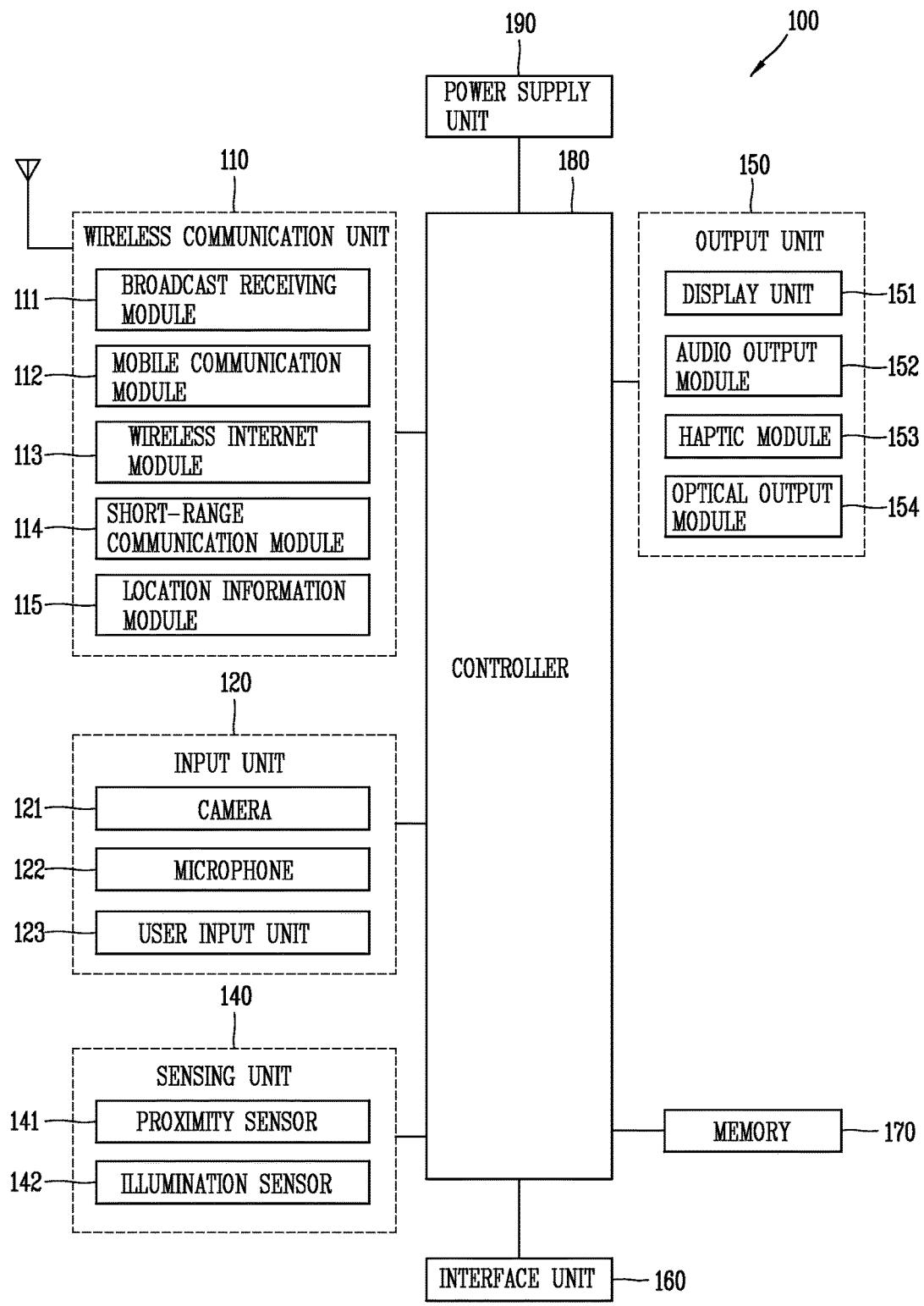
FIG. 1 is a block diagram for describing a wearable device according to an embodiment of the present invention.

FIG. 1 is a block diagram for describing a wearable device according to an embodiment of the present invention.

The wearable device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the wearable device 100 is shown having wireless communication unit 110 configured with several commonly implemented components. For instance, the wireless communication unit 110 typically includes one or more components which permit wireless communication between the wearable device 100 and a wireless communication system or network within which the wearable device is located.

The wireless communication unit 110 typically includes one or more modules which permit communications such as wireless communications between the wearable device 100 and a wireless communication system, communications between the wearable device 100 and another wearable device, communications between the wearable device 100 and an external server. Further, the wireless communication unit 110 typically includes one or more modules which connect the wearable device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the wearable device, the surrounding environment of the wearable device, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The wearable device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the wearable device 100 and a user, as well as function as the user input unit 123 which provides an input interface between the wearable device 100 and the user.

The interface unit 160 serves as an interface with various types of external devices that can be coupled to the wearable device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the wearable device 100 may perform assorted control functions associated with a connected external device, in response to the external device being connected to the interface unit 160.

The memory 170 is typically implemented to store data to support various functions or features of the wearable device 100. For instance, the memory 170 may be configured to store application programs executed in the wearable device 100, data or instructions for operations of the wearable device 100, and the like. Some of these application programs may be downloaded from an external server via wireless communication. Other application programs may be installed within the wearable device 100 at time of manufacturing or shipping, which is typically the case for basic functions of the wearable device 100 (for example, receiving a call, placing a call, receiving a message, sending a message, and the like). It is common for application programs to be stored in the memory 170, installed in the wearable device 100, and executed by the controller 180 to perform an operation (or function) for the wearable device 100.

The controller 180 typically functions to control overall operation of the wearable device 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the wearable device 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external wearable device, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the wearable device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the wearable device 100 and a wireless communication system, communications between the wearable device 100 and another wearable device 100, or communications between the wearable device and a network where another wearable device 100 (or an external server) is located, via wireless area networks. One example of the wireless area networks is a wireless personal area networks.

In some embodiments, another wearable device (which may be configured similarly to wearable device 100) may be a wearable device, for example, a smart watch, a smart glass or a head mounted display (HMD), which is able to exchange data with the wearable device 100 (or otherwise cooperate with the wearable device 100). The short-range communication module 114 may sense or recognize the wearable device, and permit communication between the wearable device and the wearable device 100. In addition, when the sensed wearable device is a device which is authenticated to communicate with the wearable device 100, the controller 180, for example, may cause transmission of data processed in the wearable device 100 to the wearable device via the short-range communication module 114. Hence, a user of the wearable device may use the data processed in the wearable device 100 on the wearable device. For example, when a call is received in the wearable device 100, the user may answer the call using the wearable device. Also, when a message is received in the wearable device 100, the user can check the received message using the wearable device.

The location information module 115 is generally configured to detect, calculate, derive or otherwise identify a position of the wearable device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the wearable device.

As one example, when the wearable device uses a GPS module, a position of the wearable device may be acquired using a signal sent from a GPS satellite. As another example, when the wearable device uses the Wi-Fi module, a position of the wearable device can be acquired based on information related to a wireless access point (AP) which transmits or receives a wireless signal to or from the Wi-Fi module.

The input unit 120 may be configured to permit various types of input to the wearable device 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the wearable device 100. As another example, the cameras 121 may be located in a stereoscopic arrangement to acquire left and right images for implementing a stereoscopic image.

The microphone 122 is generally implemented to permit audio input to the wearable device 100. The audio input can be processed in various manners according to a function being executed in the wearable device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the wearable device 100. The user input unit 123 may include one or more of a mechanical input element (for example, a key, a button located on a front and/or rear surface or a side surface of the wearable device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the wearable device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the wearable device, surrounding environment information of the wearable device, user information, or the like. The controller 180 generally cooperates with the sending unit 140 to control operation of the wearable device 100 or execute data processing, a function or an operation associated with an application program installed in the wearable device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the wearable device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the wearable device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the wearable device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the wearable device 100. For example, the display unit 151 may display execution screen information of an application program executing at the wearable device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may convert and output as sound audio data received from the wireless communication unit 110 or stored in the memory 170 in a call signal reception mode, a call mode, a record mode, a voice recognition mode, a broadcast reception mode, and the like. Also, the audio output module 152 may provide audible outputs related to a particular function performed by the wearable device 100 (e.g., a call signal reception sound, a message reception sound, etc.). The audio output module 152 may include a speaker, a buzzer or the like.

A haptic module 153 generates various tactile effects the user may feel. A typical example of the tactile effects generated by the haptic module 153 is vibration. The strength and pattern of the haptic module 153 can be controlled. For example, different vibrations may be combined to be outputted or sequentially outputted.

Besides vibration, the haptic module 153 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 153 may be implemented to allow the user to feel a tactile effect through a muscle sensation such as fingers or arm of the user, as well as transferring the tactile effect through a direct contact. Two or more haptic modules 155 may be provided according to the configuration of the wearable device 100.

An optical output module 154 can output a signal for indicating an event generation using light of a light source. Examples of events generated in the wearable device 100 may include message reception, call signal reception, a missed call, an alarm, a schedule notice, an email reception, information reception through an application, and the like.

A signal output by the optical output module 154 may be implemented in such a manner that the wearable device emits monochromatic light or light with a plurality of colors. The signal output may be terminated as the wearable device senses that a user has checked the generated event, for example.

The interface unit 160 serves as an interface for external devices to be connected with the wearable device 100. For example, the interface unit 160 can receive data transmitted from an external device, receive power to transfer to elements and components within the wearable device 100, or transmit internal data of the wearable device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the wearable device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the wearable device 100 is connected with an external cradle, the interface unit 160 can serve as a passage to allow power from the cradle to be supplied to the wearable device 100 or may serve as a passage to allow various command signals input by the user from the cradle to be transferred to the wearable device there through. Various command signals or power input from the cradle may operate as signals for recognizing that the wearable device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The wearable device 100 may also be operated in relation to a network storage device that performs the storage function of the memory 170 over a network, such as the Internet.

The controller 180 may typically control the general operations of the wearable device 100. For example, the controller 180 may set or release a lock state for restricting a user from inputting a control command with respect to applications when a status of the wearable device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the wearable device 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Examples of the wearable device 100 include a smart watch, a smart glass, a head mounted display (HMD), and the like.

A typical wearable device can exchange data with (or cooperate with) another wearable device 100. In such a device, the wearable device generally has functionality that is less than the cooperating wearable device. For instance, the short-range communication module 114 of a wearable device 100 may sense or recognize a wearable device that is near-enough to communicate with the wearable device. In addition, when the sensed wearable device is a device which is authenticated to communicate with the wearable device 100, the controller 180 may transmit data processed in the wearable device 100 to the wearable device via the short-range communication module 114, for example. Hence, a user of the wearable device can use the data processed in the wearable device 100 on the wearable device. For example, when a call is received in the wearable device 100, the user can answer the call using the wearable device. Also, when a message is received in the wearable device 100, the user can check the received message using the wearable device.

Figure 2:
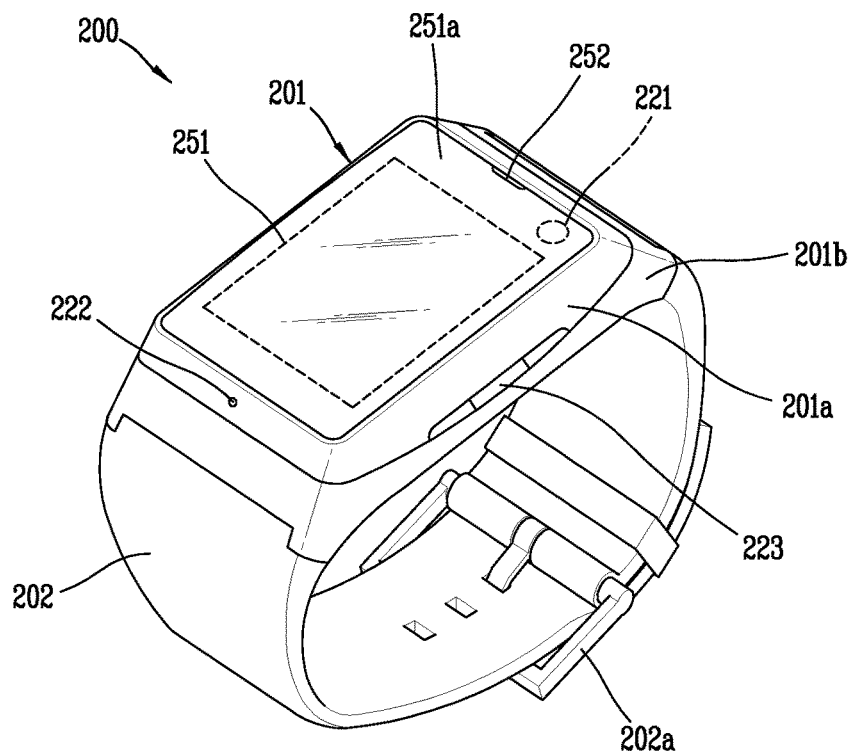
FIG. 2 is a perspective view illustrating an example of a watch type wearable device according to an embodiment of the present invention.

FIG. 2 is a perspective view illustrating one example of a watch-type wearable device 100 in accordance with another exemplary embodiment. As illustrated in FIG. 2, the watch-type wearable device 200 includes a main body 201 with a display unit 251 and a band 202 connected to the main body 201 to be wearable on a wrist. In general, the wearable device 200 may be configured to include features that are the same or similar to that of the wearable device 100 of FIG. 1.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a wearable device 200 with a uni-body.

The watch-type wearable device 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes an audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include a fastener 202a. The fastener 202a may be implemented into a buckle type, a snap-fit hook structure, a Velcro® type, or the like, and include a flexible section or material. The drawing illustrates an example that the fastener 202a is implemented using a buckle.

In this disclosure below, for convenience of description, a wearable device 100 is assumed as a smart watch. However, the present invention is not limited thereto.

Figure 3:
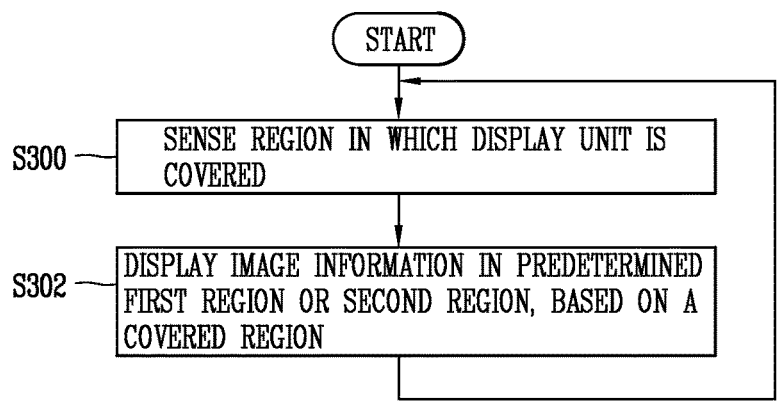
FIG. 3 is a conceptual view for describing a method of providing different UIs on the basis of a covered state in a smart watch according to an embodiment of the present invention.

FIG. 3 is a conceptual view for describing a method of providing different UIs on the basis of a covered state in a smart watch 100 according to an embodiment of the present invention.

First, in operation S300, the smart watch 100 according to an embodiment of the present invention may sense a region in which a display unit 151 is covered by an object.

In operation S300, a control unit 180 may sense a region in which the display unit 151 is covered, by using various methods. For example, by using at least one illuminance sensor 142 which is disposed near the display unit 151, the control unit 180 may determine a region of the display unit 151, in which illuminance less than a certain level is sensed, as a region covered by an object (for example, clothes such as sleeves of a user). Alternatively, by using a proximity sensor 141, the control unit 180 may determine a region of the display unit 151, in which an object is sensed within a predetermined distance, as the region covered by the object.

Moreover, the control unit 180 may display image information in a predetermined first region or a predetermined second region, based on a region of the display unit 151 covered by the object. In more detail, the control unit 180 may detect a region of the display unit 151 which is not covered by the object, and determine a region in which image information is to be displayed, based on whether the uncovered region corresponds to the predetermined first region or second region.

For example, the first region and the second region may be partial regions which are set in a region disposed on the reverse of a direction in which the display unit 151 is covered, in the display unit 151. Here, the second region may be a larger region including the first region, or may be an entire region of the display unit 151.

In this case, when a region of the display unit 151 which is not covered by the object is equal to or greater than the first region, the control unit 180 may provide a UI that displays image information in the first region, and the uncovered region is equal to or greater than the second region, the control unit 180 may provide a UI that displays the image information in the second region, in operation S302. Here, if the second region is the entire region of the display unit 151, the control unit 180 may provide the UI, which displays the image information in the second region, when the entire region of the display unit 151 is exposed. An example, in which the image information is displayed in the first region or the second region on the basis of the uncovered region of the display unit 151, will be described in more detail with reference to FIGS. 7A and 7B.

The image information (hereinafter referred to as first image information) displayed in the first region may differ from the image information (hereinafter referred to as second image information) displayed in the second region. For example, the first image information may be notification information for notifying information associated with an event which occurs in the smart watch 100, and the second image information may be information that further includes additional information associated with the notification information. That is, for example, when message reception notification is displayed in the first region, a sender of a received message and information about a time when the message is received may be further displayed in the second region.

Moreover, when the notification information displayed in the first region is relevant to a specific function which is performed in the smart watch 100, the information displayed in the second region may be information associated with the specific function. That is, when the notification information displayed in the first region notifies the incoming of a call, information (i.e., a call function, a call recording function, or a function of postponing a call) associated with a function relating to the incoming of the call may be further displayed in the second region. In this case, a user may select various functions associated with the notification information (i.e., the information displayed in the first region) by using the image information displayed in the second region, and allow the selected functions to be performed.

When the first image information is displayed in the first region or the second image information is displayed in the second region, the control unit 800 may again proceed to operation S300, and sense a region in which the display unit 151 is covered. Furthermore, in operation S302, the control unit 180 may determine a UI which is to be provided, based on the sensing result of operation S300. Therefore, a provided UI may be changed. That is, for example, when the first image information is displayed in the predetermined first region of the display unit 151, this state may be maintained according to the sensing result of operation S300, or may be changed to a state in which the second image information is displayed in the second region.

The smart watch 100 according to an embodiment of the present invention maintain a specific UI when a region in which the display unit 151 is covered is changed within a certain level. To this end, in the smart watch 100 according to an embodiment of the present invention, a partial region of the display unit 151 may be set to a threshold region, and whether to change a UI may be determined depending on whether the region in which the display unit 151 is covered includes the set threshold region.

Figure 4:
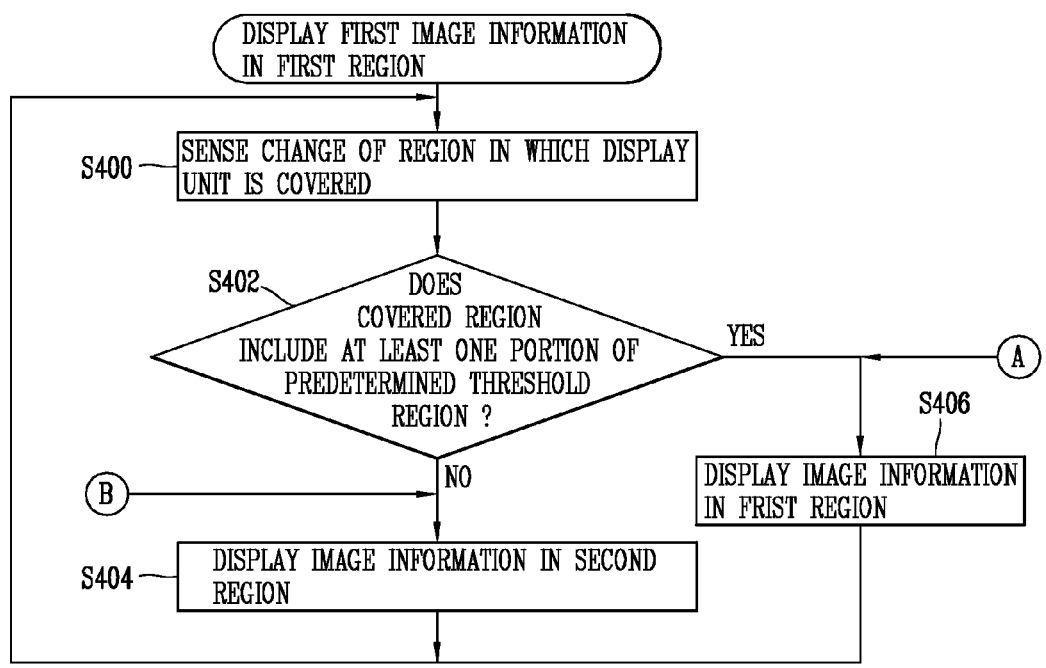
FIG. 4 is a conceptual view for describing an operation of maintaining a specific UI when a covered region is changed, in the smart watch according to an embodiment of the present invention.

In this case, FIG. 4 is a conceptual view for describing an operation of maintaining a specific UI when a covered region is changed, in the smart watch according to an embodiment of the present invention.

For example, when a current UI is a UI (hereinafter referred to as a first UI) which displays the first image information in the predetermined first region, the control unit 180 may again determine whether a region in which the display unit 151 is covered is changed, in operation S400. When the region in which the display unit 151 is covered is changed, the control unit 180 may detect whether the covered region includes at least one portion of the predetermined threshold region, in operation S402. When the region in which the display unit 151 is covered includes the at least one portion of the predetermined threshold region as the detection result of operation S402, the control unit 180 may display the first image information in the first region, in operation S406. Therefore, when a currently provided UI (i.e., the first UI) is in a state where the first image information is displayed in the predetermined first region, the control unit 180 may continuously maintain the state.

Here, when the region in which the display unit 151 is covered is changed by less than a certain level, the threshold region denotes a region that is predetermined in the display unit 151 so as to prevent a UI from being changed by the change of the covered region.

For example, the threshold region may be used to detect whether a region in which the display unit 151 is covered exceeds a certain region of the display unit 151. In this case, when the region in which the display unit 151 is covered by the object includes at least one portion of the threshold region, the control unit 180 may determine that the region in which the display unit 151 is covered exceeds the certain region. On the other hand, when the region in which the display unit 151 is covered by the object does not include the at least one portion of the threshold region, the control unit 180 may determine that the region in which the display unit 151 is covered does not exceed the certain region.

As described above, in a state where the first UI is provided, when a change of the region in which the display unit 151 is covered is detected, and the changed region includes at least one portion of the threshold region, the control unit 180 may determine that the change of the region in which the display unit 151 is covered is equal to or less than a predetermined range, and maintain the state in which the first UI is provided.

However, when the changed region does not include the threshold region at all, the control unit 180 may determine that the change of the region in which the display unit 151 is covered exceeds the predetermined range. In this case, the control unit 180 may allow another UI to be provided. Therefore, when the region in which the display unit 151 is covered does not include the at least one portion of the predetermined threshold region as the detection result of operation S402, the control unit 180 may provide the second UI that displays the second image information in another region (i.e., the second region), in operation S404.

When the first image information is displayed in the first region through operation S406 or the second image information is displayed in the second region through operation S404, the control unit 180 may again proceed to operation S400, and sense a change of the region in which the display unit 151 is covered. Also, the control unit 180 may maintain the state in which the first UI is provided or change the state to the state in which the second UI is provided, through operation S404 or operation S406 according to the sensing result of operation S400.

In the description of FIG. 4, in a state (a state in which the first image information is displayed in the first region) where the first UI is provided, a case in which the change of the region in which the display unit 151 is covered is sensed has been described as an example. However, the operation described above with reference to FIG. 4 may be identically performed even in a case (a state in which the second image information is displayed in the second region) where the second UI is provided.

For example, when the region in which the display unit 151 is covered does not include the at least one portion of the predetermined threshold region as the detection result of operation S402, the control unit 180 may enter an operating state (i.e., a state in which the second UI is provided) that displays the second image information in the predetermined second region in operation S404. In this state, when the change of the region in which the display unit 151 is covered is again sensed (operation S400), the control unit 180 may proceed to operation S402, and may again detect whether the region in which the display unit 151 is covered includes at least one portion of the predetermined threshold region.

Although the change of the region in which the display unit 151 is covered is detected as the detected result, when the region in which the display unit 151 is covered does not still include the predetermined threshold region at all, the control unit 180 may again proceed to operation S404, and enter the state in which the second UI is provided. Therefore, the smart watch 100 according to an embodiment of the present invention may still maintain the state in which the second UI is provided.

Therefore, in the smart watch 100 according to an embodiment of the present invention, when the change of the region in which the display unit 151 is covered is sensed, the control unit 180 may change UI only when the change of the covered region is equal to or greater than a certain level. The changed UI may be determined based on a region in which the display unit 151 is covered and which is changed by equal to or more than the certain level, and may be a UI that displays image information different from image information displayed by a UI previous to the change.

At least one of a size and a position of the threshold region may be changed by reflecting a motion state or a posture of the user. For example, the control unit 180 of the smart watch 100 according to an embodiment of the present invention may greatly change the size of the threshold region when the user has a number of motions like running as a sensing result of the motion state of the user. Alternatively, the control unit 180 may less change the size of the threshold region when the motion of the user is equal to or less than a certain level like standing or slowly walking as the sensing result of the motion state of the user. Also, the changed size of the threshold region may be changed in proportion to a degree of the sensed motion of the user. That is, as the number of motions of the user increases, the size of the threshold region may be greatly changed, and as the number of motions of the user decreases, the size of the threshold region may be less changed.

Here, the size of the threshold region may increase or decrease with respect to a reference line which is predetermined in the threshold region, and the reference line of the threshold region may be designated by the user or may be determined with respect to the center of the threshold region.

In this case, the control unit 180 may determine the motion state of the user by using various methods. For example, the control unit 180 may use measurement results of various sensors included in a sensing unit 140, for example, sensors, which measure various position moving states of the smart watch 100, such as an inertia sensor and a gyro sensor. In this case, the control unit 180 may determine that a motion of the user is equal to or greater than a certain level or is less than the certain level, based on a frequency number in which a position of the smart watch 100 is changed by equal to or more than a predetermined range.

In addition, the control unit 180 may further determine the posture of the user. For example, the control unit 180 may detect a state in which the smart watch 100 is located, based on a measurement result of a horizon state sensor included in the sensing unit 140. Also, the control unit 180 may estimate a current posture of the user, based on a detected result.

For example, when it is determined as the detected result that the smart watch 100 is located in a horizontal state, and a position of the smart watch 100 is hardly moved as a sensing result of a position moving state of the smart watch 100 measured by the sensing unit 140, the control unit 180 may determine a state in which the user sits on a chair or the like, and an arm worn with the smart watch 100 is rested on the user's knee or a desk. On the other hand, when it is regarded that a positioned state of the smart watch 100 is a vertical state, and a movement of a position is made by equal to or more than a certain level as a position movement state sensing result of the smart watch 100, the control unit 180 may determine that the user stands or moves in a standing state.

Here, the horizontal state and the vertical state may be determined depending on a direction in which the display unit 151 faces. For example, when the smart watch 100 is located in a direction where the display unit 151 faces the ground, it may be determined that the smart watch 100 is in the horizontal state, and when the smart watch 100 is located in a direction where the display unit 151 faces the horizon, it may be determined that the smart watch 100 is in the vertical state.

In this case, the control unit 180 may change the size of the threshold region in further consideration of the determined posture of the user. For example, when it is determined that the user is in a sitting posture, the control unit 180 may decrease the size of the threshold region by a predetermined size. On the other hand, when it is determined that the user is in a standing posture, the control unit 180 may increase the size of the threshold region by the predetermined size. Hereinabove, it has been described that the size of the threshold region is changed, but the position of the display unit 151 in the threshold region may be changed based on a motion state or posture of the user.

When the display unit 151 is covered by equal to or more than a certain level, the control unit 180 of the smart watch 100 according to an embodiment of the present invention may enter a sleep mode. Here, the sleep mode is a state in which the display unit 151 is turned off for saving consumption power, and image information is no longer displayed. In this case, when the user's selection or a predetermined condition is satisfied, the control unit 180 turns on the display unit 151, and switches to a wakeup mode in which image information is displayed.

In the sleep mode, when a text message is received, there is an incoming call, or a predetermined notification condition (for example, alarm set at a specific time, information about a battery, etc.) is satisfied, the control unit 180 may notify the user of the occurrence of an event by using vibration or a haptic reaction.

Moreover, even in a case where the smart watch 100 is in the sleep mode, the control unit 180 may sense a region in which the display unit 151 is covered. In this case, when the region in which the display unit 151 is covered is changed, the control unit 180 may a UI based on the change of the region. In this case, the control unit 180 may determine a region, in which the display unit 151 is covered by an object such as the user's sleeve, and an uncovered region. Also, the display unit 151 may display the first image information in the first region or display the second image information in the second region, depending on whether the uncovered region corresponds to the first region or the second region (exceeding the first region) which is predetermined in the display unit 151.

As described above, notification information (the first image information) for notifying an event which occurs in the smart watch 100 may be displayed in the first region, and in addition to the notification information, additional information associated with the notification information may be further displayed in the second region.

In this case, when a state (i.e., a state in which the display unit 151 is covered by equal to or more than a certain level) in which the smart watch 100 operates in the sleep mode is directly changed to a state in which a region where the display unit 151 is covered does not include the predetermined threshold region at all, the display unit 151 may directly enter from an inactive state into a state (a state in which the second image information is displayed) in which detailed information associated with a currently occurred event.

In this case, in smart watch 100 according to an embodiment of the present invention, the second image information may be displayed in the second region according to the user's selection. This is for enabling the user to perceive the occurrence of an event by using the first image information which is displayed in the first region, and to selectively check detailed information associated with the event.

Figure 5:
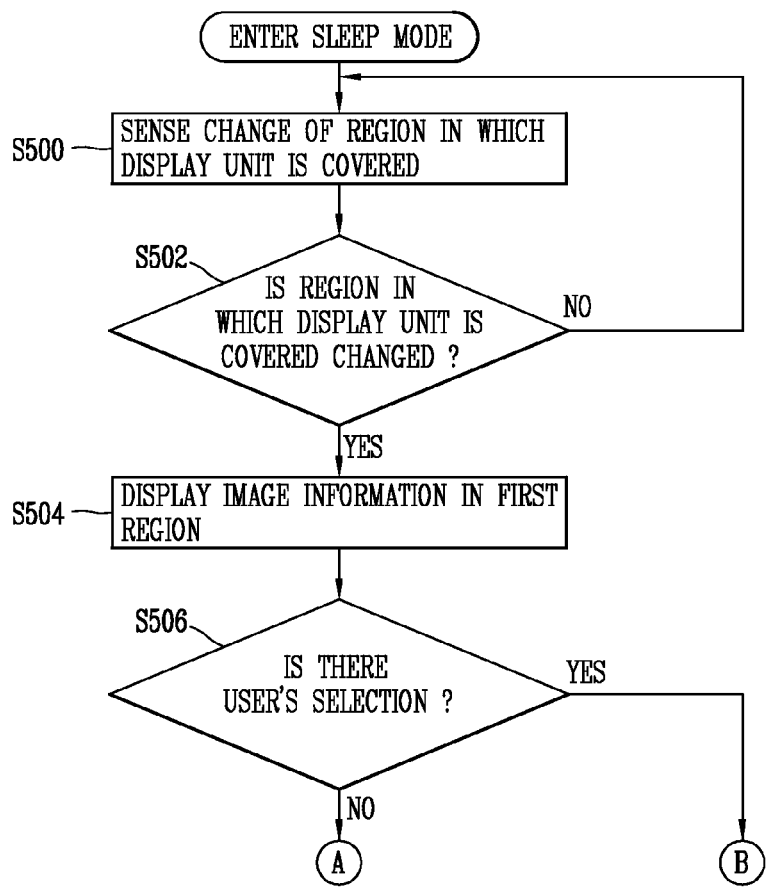
FIG. 5 is a conceptual view for describing an operation in a state where the smart watch according to an embodiment of the present invention enters a sleep mode.

FIG. 5 is for describing an operation in which the smart watch according to an embodiment of the present invention enters the sleep mode, and displays the second image information, based on the user's selection.

To provide a description with reference to FIG. 5, in operation S500, the control unit 180 of the smart watch 100 according to an embodiment of the present invention may sense a region in which the display unit 151 is covered by an object such as the user's sleeve. In operation S502, the control unit 180 determines whether the region in which the display unit 151 is covered is changed, based on the sensing result of operation S500.

When it is determined in operation S502 that the region in which the display unit 151 is covered is changed, the control unit 180 may display the first image information in the first region, in operation S504. In operation S506, the control unit 180 may detect whether there is the user's selection for the first image information displayed by the display unit 151. When it is determined in operation S506 that there is the user's selection, the control unit 181 may proceed to operation S404, and may display additional information (the second image information), associated with the first image information, in the predetermined second region. Alternatively, when it is determined in operation S506 that there is no user's selection, the control unit 181 may proceed to operation S406, and maintain a state in which the first image information is displayed in the predetermined first region. Here, the user's selection may be the user's voice signal, a predetermined gesture, or the user's touch input received by the display unit 151.

Therefore, in the smart watch 100 according to an embodiment of the present invention, when the user perceives the occurrence of an event through vibration in the sleep mode, notification information (the first image information) for notifying the event may be displayed in the display unit 151 despite that the user immediately rolls up its sleeve. Furthermore, additional information (the second image information) associated with the notification information may be displayed in the display unit 151 according to the user's selection.

Hereinabove, it has been described that the threshold region predetermined in the display unit 151 is used for allowing a provided UI to be changed even when a change of a region in which the display unit 151 is covered exceeds a certain level.

Here, the threshold region may be newly set when a specific condition is satisfied or there is the user's selection. For example, the control unit 180 may determine a re-setting of the threshold region as being needed when a state, in which a region of the display unit 151 having a predetermined size or more is covered by an object such as the user's sleeve, is maintained for a certain time. Also, the control unit 180 may determine the re-setting of the threshold region as being needed when a frequency number, in which a size of a region where the display unit 151 is covered is changed by equal to or more than a certain level, is equal to or more than the predetermined number of times. On the other hand, the control unit 180 may determine the re-setting of the threshold region as being needed when a frequency number, in which the size of the region where the display unit 151 is covered is changed by less than a certain level, is equal to or more than the predetermined number of times.

When a predetermined specific event occurs in the smart watch 100, the control unit 180 may determine there to be the user's selection. Here, the specific event may be predetermined by the user. For example, in a case where an event which is set by the user in order for a re-setting of the threshold region to be performed is a call incoming event, the control unit 180 may re-set the threshold region when the call incoming event occurs in the smart watch 100.

The threshold region may be set by various methods. For example, a specific region of the display unit 151 may be set as the threshold region according to the user's designation, or the threshold region may be determined based on regions in which the display unit 151 is covered and which are measured in units of a reference time for a certain time.

Figure 6:
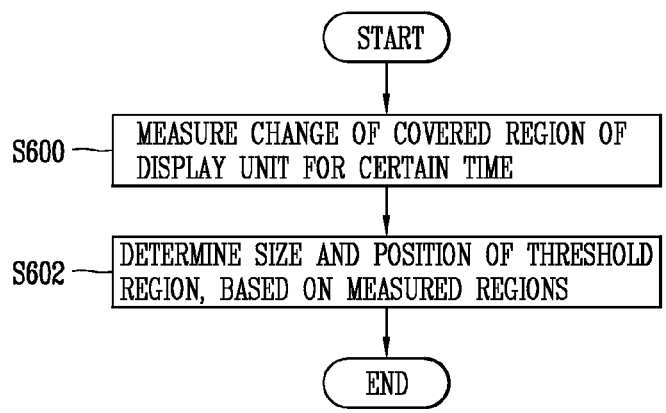
FIG. 6 is a conceptual view for describing an operation of setting a threshold region in the smart watch according to an embodiment of the present invention.

FIG. 6 is for describing an example of an operation of setting a threshold region in the smart watch according to an embodiment of the present invention.

To provide a description with reference to FIG. 6, when there is the user's selection or a predetermined threshold region setting condition is satisfied, the control unit 180 of the smart watch 100 according to an embodiment of the present invention may measure a change of a region, in which the display unit 151 is covered, in units of the reference time for a certain time in operation S600. Therefore, in operation S600, a plurality of display regions which are measured in units of the reference time may be detected.

In operation S602, the control unit 180 may determine a size and position of the threshold region, based on the detected plurality of display regions. For example, the control unit 180 may calculate an average region of the detected display regions, and set the threshold region with respect to a region limit of the calculated average region. Alternatively, the control unit 180 may divide the detected regions into regions, which include an entirety of a predetermined certain region, and regions which do not include the entirety of the predetermined certain region, and determine the size and position of the threshold region, based on regions limits of average regions calculated from the divided regions. An example, in which the threshold region is set by various methods as described above, will be described in more detail with reference to FIGS. 9A and 9B.

Hereinabove, an operation of the smart watch that is the wearable device according to an embodiment of the present invention has been described in detail as an example. In the below description, an example in which the smart watch 100 according to an embodiment of the present invention operates according to the above-described operation will be described in more detail with reference to the accompanying drawings.

Figure 7A:
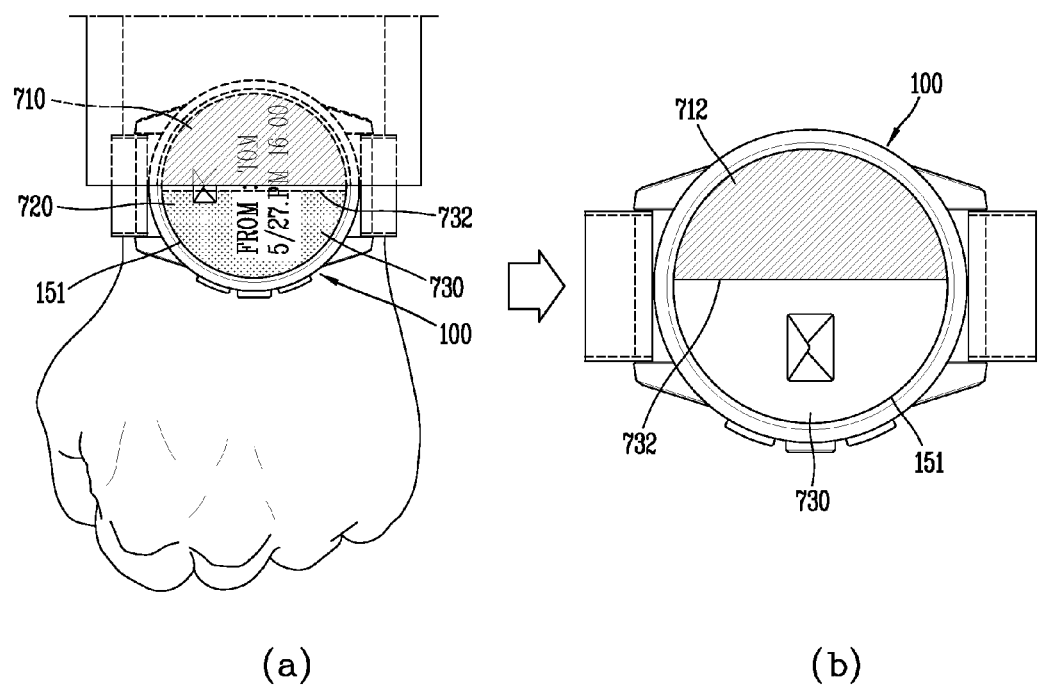
FIGS. 7A and 7B are exemplary diagrams illustrating examples in which the smart watch according to an embodiment of the present invention provides different UIs depending on a state in which a display unit is covered.
Figure 7B:
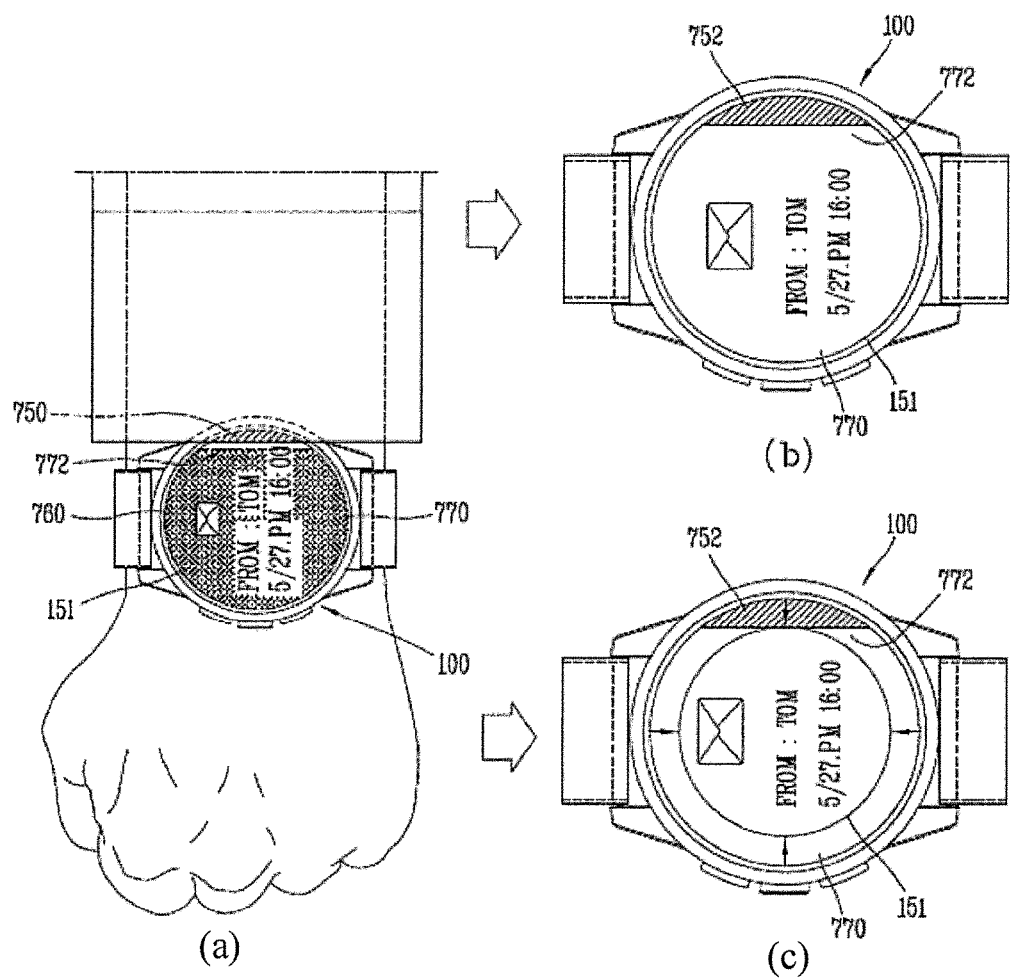

FIGS. 7A and 7B are exemplary diagrams illustrating examples in which the smart watch according to an embodiment of the present invention provides different UIs depending on a state in which a display unit is covered.

According to the above description of FIG. 4, the control unit 180 of the smart watch 100 according to an embodiment of the present invention may display image information in the predetermined first region or second region, based on a region in which the display unit 151 is not covered by an object such as the user's clothes. The predetermined second region may be disposed in a direction opposite to a direction in which the display unit 151 is covered, and may be a large region including the first region.

First, FIG. 7A (a) illustrates an example in which the first image information is displayed in the first region when a region, in which the display unit 151 is not covered, corresponds to the predetermined first region. For example, the control unit 180 may detect a region 710 in which the display unit 151 is covered by an object, and compare a predetermined region 730 with a region (i.e., an uncovered region 720) of the display unit 151 other than the detected region 710.

Therefore, as seen in FIG. 7A (a), when the region 720 in which the display unit 151 is not covered exceeds a region limit 732 of the first region 730, the control unit 180 may provide a first UI that displays the first image information in the predetermined first region 730 of the display unit 151. In this case, the first image information may be displayed in the first region 730, and a region 712 of the display unit 151 other than the first region 730 may maintain a state (i.e., an inactive state) in which image information is not displayed. Such an example is illustrated in FIG. 7A (b).

As seen in FIG. 7A (b), when a partial region of the display unit 151 is covered by an object such as sleeve, image information displayed by the display unit 151 may be changed. That is, in a state where the smart watch 100 is not covered, various pieces of information including an occurred event may be displayed by the display unit 151. However, as seen in FIG. 7A (a), when a portion of the display unit 151 is covered, the control unit 180 may display only summary information, obtained by summarizing pieces of information displayed by the display unit 151, in a predetermined region (i.e., the first region) of the display unit 151. For example, as seen in FIG. 7A (b), the control unit 180 may display, as the first image information displayed in the first region, only notification information for notifying an event which occurs in the smart watch 100. This, as seen in FIG. 7A (b), is for more efficiently using an uncovered region of the display unit 151 because a size of an exposed region of the display unit 151 is reduced when a portion of the display unit 151 is covered.

Moreover, when a region in which the display unit 151 is covered corresponds to the predetermined second region, the control unit 180 may provide a second UI that displays the second image information in the predetermined second region. For example, when a region 760 of the display unit 151 which is not covered by an object exceeds a region limit 772 of the predetermined second region 770, the control unit 180 may allow the second UI to be provided. In this case, the second image information may be displayed in the second region 770, and a region 752 of the display unit 151 other than the second region 770 may maintain a state (i.e., an inactive state) in which image information is not displayed. Such an example is illustrated in FIGS. 7A (a) and (b).

As described above, the second image information may further include additional information associated with the first image information. That is, as seen in FIG. 7A (b), when notification information for notifying the reception of a message is displayed as the first image information, as seen in FIGS. 7A (b) and (c), information (i.e., information which further includes additional information about a sender and a time when the message is received) associated with the received message may be displayed as the second image information.

The second image information may be displayed in various types. For example, as seen in FIG. 7B (b), the second image information may be displayed with respect to the second region 770, or as seen in FIG. 7B (c), the second image information may be displayed to have a reduced size in consideration of a size of the deactivated region 752.

As seen in FIGS. 7A and 7B, when a partial region of the display unit 151 is covered by an object, the smart watch 100 may operation in a state (a state in which the first UI is provided) where the first image information is displayed in the first region or a state (a state in which the second UI is provided) where the second image information is displayed in the second region. In this case, the control unit 180 may sense a change of a covered region of the display unit 151, and only when the change is equal to or more than a certain level, the control unit 180 may allow the UI to be changed.

Figure 8A:
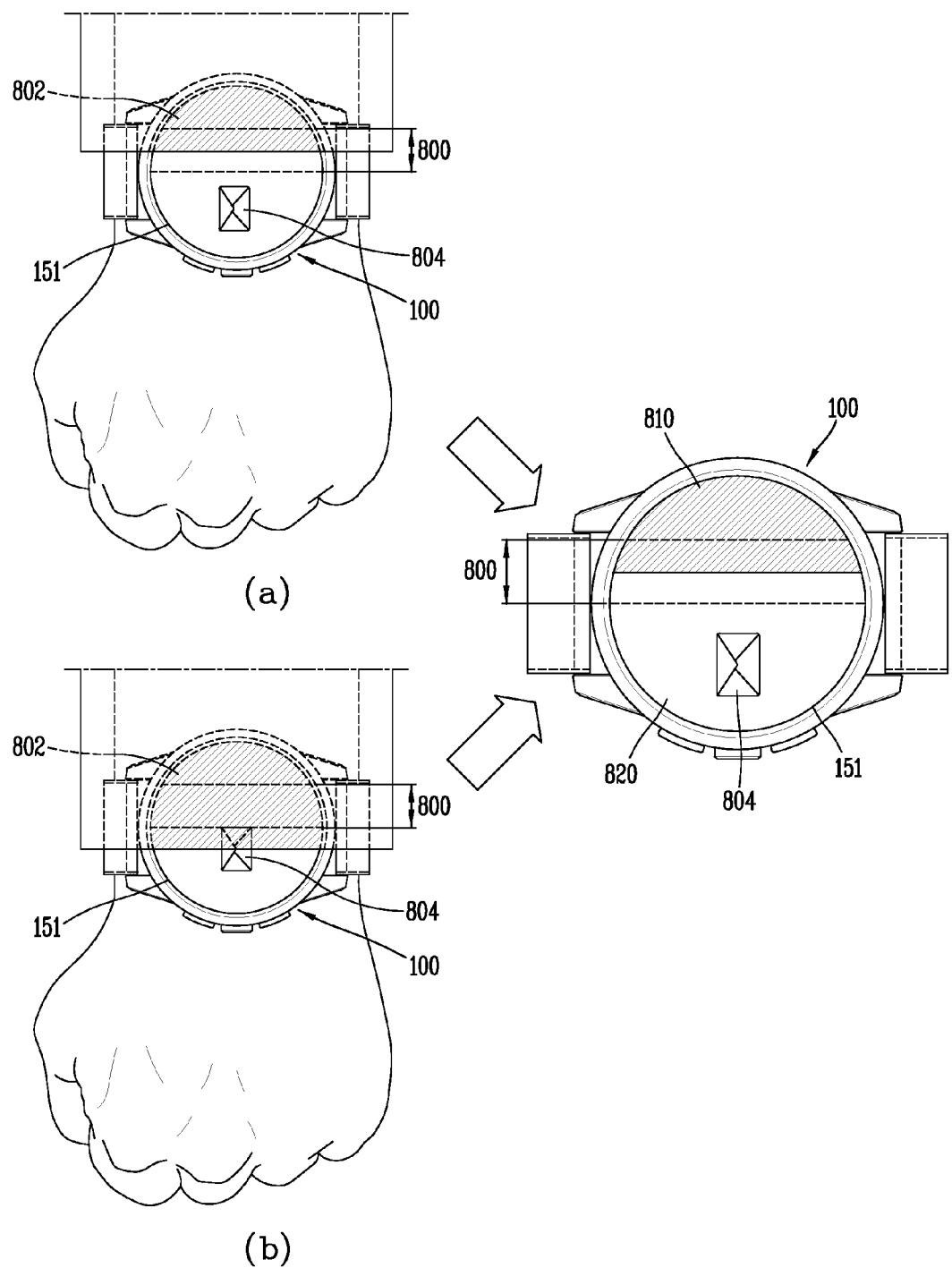
Figure 8B:
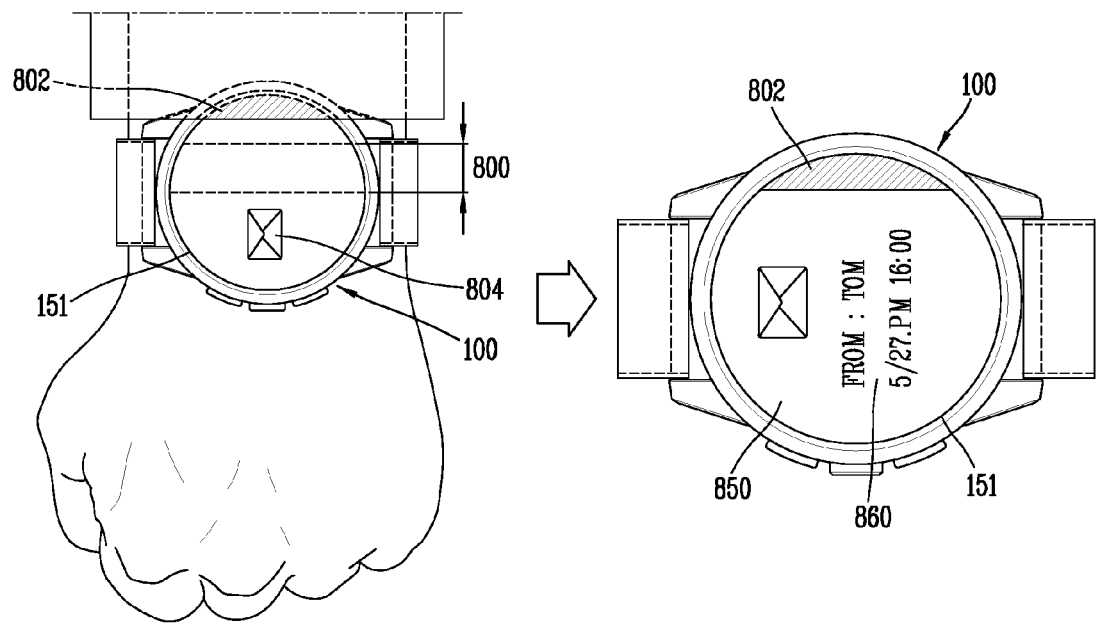
Figure 8B:
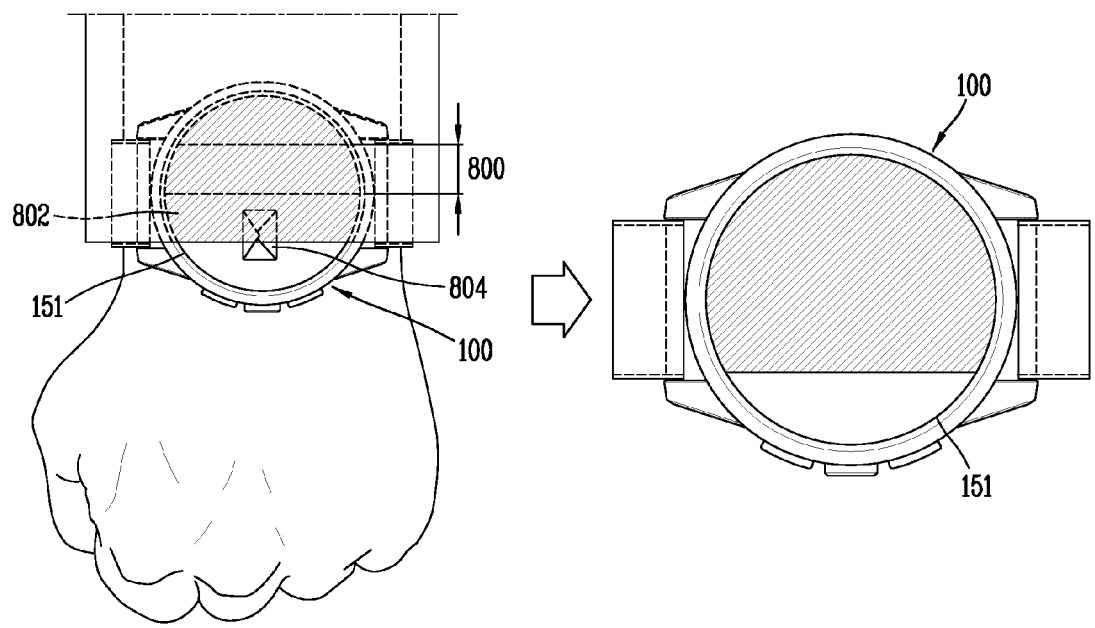

FIGS. 8A to 8C are exemplary diagrams illustrating examples in which a UI is changed in the smart watch according to an embodiment of the present invention.

For example, in a state where first image information 804 is displayed by the display unit 151, when a region in which the display unit 151 is covered by an object such as sleeve is changed, the control unit 180 may operate as different UIs according to whether the change is made within a range in which the covered region of the display unit 151 includes at least one portion of the predetermined threshold region.

That is, when a covered region 802 of the display unit 151 includes a portion of a predetermined threshold region 800 as seen in FIG. 8A (a), or the covered region 802 includes all the predetermined threshold region 800 as seen in FIG. 8A (b), the control unit 180 may maintain a state in which the first image information 804 is displayed in a first region 820 as seen in FIG. 8A (c).

On the other hand, as seen in FIG. 8B (a), when the covered region of the display unit 151 does not include the predetermined threshold region at all, the control unit 180 may determine that the covered region of the display unit 151 is changed by equal to or more than a predetermined level. Therefore, as seen in FIG. 8B (b), the control unit 180 may operate in a state (i.e., the second UI) where second image information 860 is displayed in a predetermined second region 850 of the display unit 151.

In addition, when a size of a region of the display unit 151 which is covered by an object is equal to or more than a predetermined size, the control unit 180 may operate in the sleep mode where the display unit 151 is wholly deactivated. That is, such an example is illustrated in FIG. 8B (c).

As described above, in the smart watch 100 according to an embodiment of the present invention, in a state where the control unit 180 operates in the sleep mode, when a region in which the display unit 151 is covered is changed, the control unit 180 may operate as a UI based on the change of the covered region.

In addition, when the region in which the display unit 151 is covered is changed, the control unit 180 may operate as the second UI, which further displays additional information about currently-generated notification information, according to the user's selection. FIG. 8C is for describing the case.

That is, as seen in FIG. 8C (a), when the covered region 802 of the display unit 151 is equal to or more than a certain level, the control unit 180 may operate in the sleep mode where the display unit 151 is wholly deactivated. In this state, for example, when an event occurs, the control unit 180 may notify the user of the occurrence of the event by using vibration, a haptic reaction, or a sound signal. Furthermore, when the user removes an object covering the display unit 151 so as to check the event, as seen in FIG. 8C (c), a region in which the display unit 151 is covered may be changed to a state in which an entire region of the display unit 151 is exposed or only a region having less than a predetermine size is covered by an object.

As seen in FIG. 8C (c), when the control unit 180 operates in the sleep mode, the control unit 180 may maintain a state in which the display unit 151 is wholly deactivated. When a region in which the display unit 151 is covered is changed and thus the entire region of the display unit 151 is exposed as seen in FIG. 8C (b), the control unit 180 may first display the first image information 804 in the first region 820 as seen in FIG. 8C (d). Furthermore, when there is the user's selection (a touch input applied to the display unit 151) as seen FIG. 8C (e), the control unit 180 may display the second image information 860, which further includes additional information associated with the first image information, in the predetermined second region 850 as seen FIG. 8C (f). In FIG. 8C (f), the predetermined second region 850 is assumed as the entire region of the display unit 151.

The threshold region may be set by various methods. For example, as described above, the threshold region may be determined depending on a state in which a region in which the display unit 151 is covered by an object is changed for a certain time. For example, the control unit 180 may detect the covered regions of the display unit 151 in units of a predetermined reference time for the certain time, and set the threshold region with respect to the detected regions.

Figure 9A:
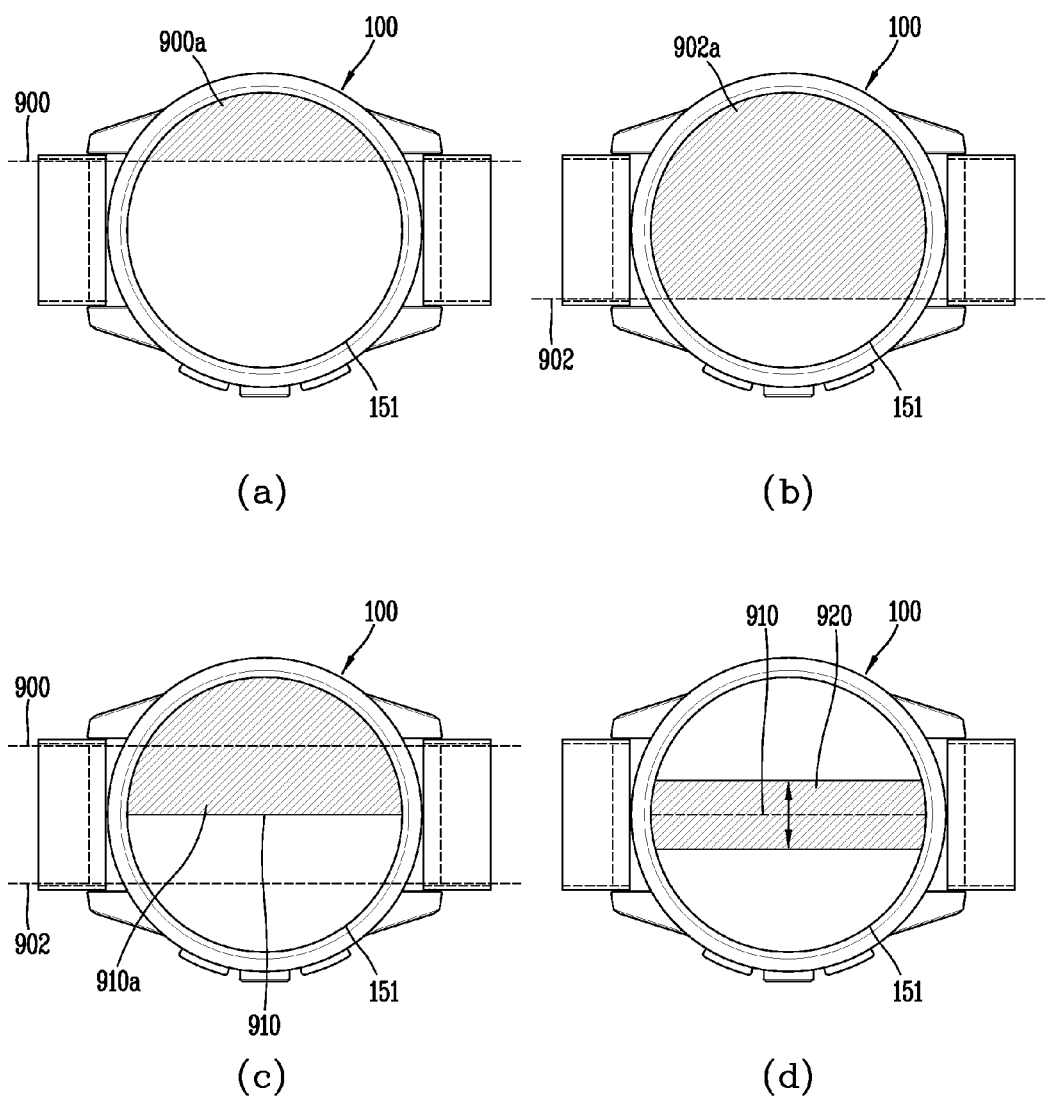
FIGS. 9A and 9B are exemplary diagrams illustrating examples in which a threshold region is determined in the smart watch according to an embodiment of the present invention.
Figure 9B:
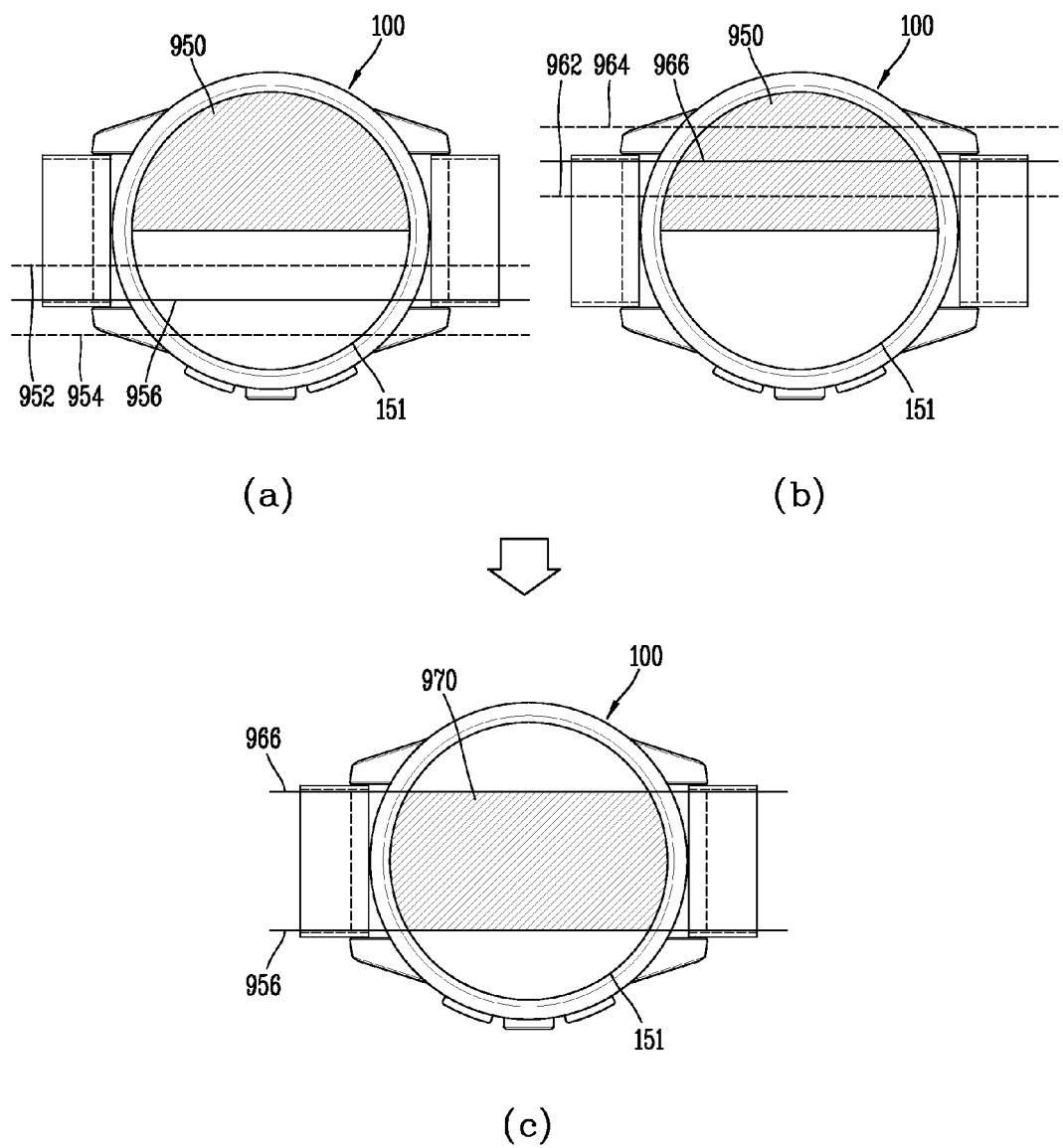

FIGS. 9A and 9B illustrate a plurality of regions which are detected in units of the reference time. That is, when the reference time is one second, and the certain time is two seconds, the control unit 180 may detect a region, in which the display unit 151 is covered, twice for the certain time (two seconds), and the detected regions may be regions 900a and 902a respectively illustrated in FIGS. 9A (a) and (b).

In this state, as seen in FIG. 9A (c), the control unit 180 may calculate an average region 910a of the regions 900a and 902a. When the average region 910a is calculated, the control unit 180 may generate a threshold region 920 having a predetermined size with respect to a region limit 910 of the average region 910a. Here, the region limit 910 of the average region 910a may be a reference line in which the threshold region further increases or decreases depending on a motion state or posture of the user.

Alternatively, the control unit 180 may generate the threshold region in another method. For example, the control unit 180 may divide the regions of the display unit 151 (which are detected in units of the predetermined reference time for the certain time) into regions, which include an entirety of a predetermined region, and regions which do not include the entirety of the predetermined region at all. Furthermore, the control unit 180 may set a first threshold limit and a second threshold limit of the threshold region by using average regions calculated from the divided regions.

That is, as seen in FIG. 9B (a), the control unit 180 may select regions, including an entirety of a predetermined region 950, from among the regions of the display unit 151 which are detected in units of the predetermined reference time for the certain time. In this case, regions corresponding to region limits 952 and 954 illustrated in FIG. 9B (a) are regions in which the display unit 151 is covered by an object up to the region limits 952 and 954, and thus may be selected, by the control unit 180, as regions including an entirety of the predetermined region 950. Also, the control unit 180 may calculate an average region (a first average region) of the selected regions.

On the other hand, the control unit 180 may select regions, including an entirety of the predetermined region 950, from among the regions of the display unit 151 which are detected for the certain time. For example, regions corresponding to region limits 962 and 964 illustrated in FIG. 9B (b) are regions in which the display unit 151 is covered by an object up to the region limits 962 and 964, and thus are regions which do not include an entirety of the predetermined region 950. Therefore, regions corresponding to the region limits 962 and 964 may be selected by the control unit 180, and the control unit 180 may calculate an average region (a first average region) of the selected regions.

As described above, when the first average region and the second average region are calculated, the control unit 180 may set a threshold region by using the first average region and the second average region. That is, as seen in FIG. 9B (c), the control unit 180 may set, as the threshold region, a region corresponding to a position between the region limit 956 of the first average region and the region limit 966 of the second average region.

The threshold region may be set by various methods in addition to the method described above with reference to FIGS. 9A and 9B.

In the smart watch 100 according to an embodiment of the present invention, a position in which the first image information or the second image information is displayed may be changed depending on a direction in which the display unit 151 is covered.

Figure 10A:
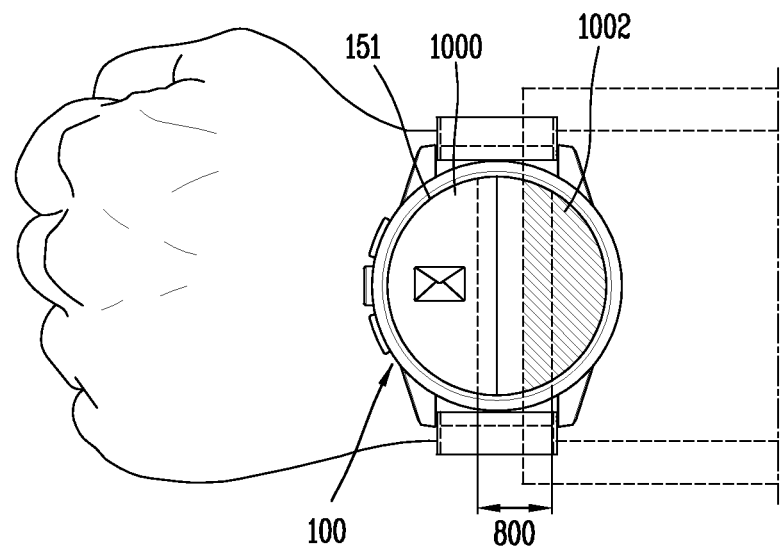
FIGS. 10A and 10B are exemplary diagrams illustrating examples in which image information is displayed at different positions on the basis of a direction in which the display unit is covered, in the smart watch according to an embodiment of the present invention.
Figure 10A:
Figure 10A:
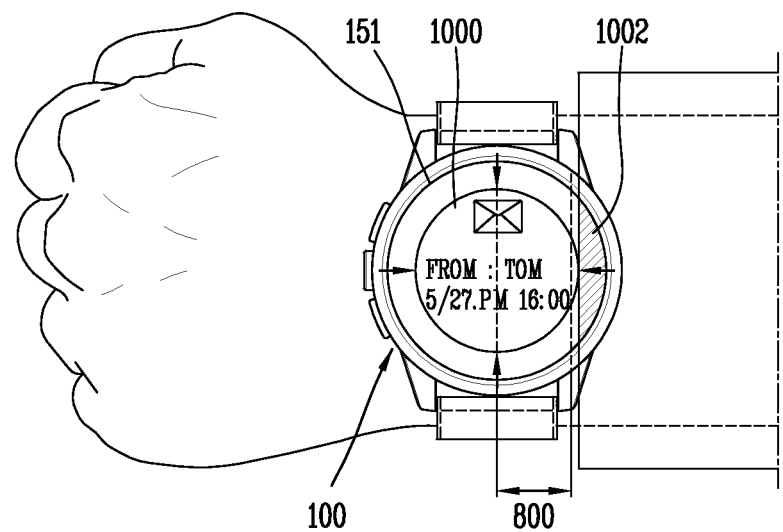
Figure 10B:
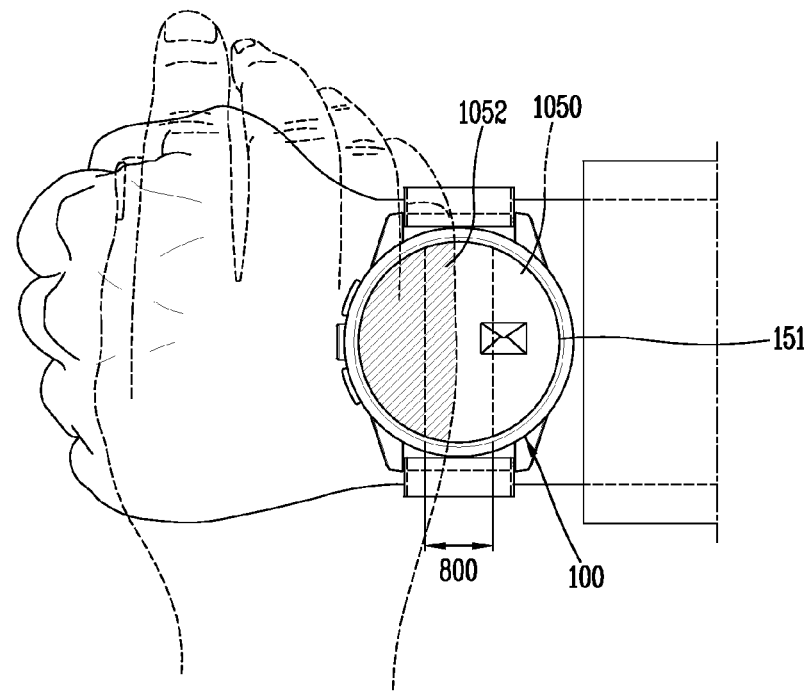
Figure 10B:
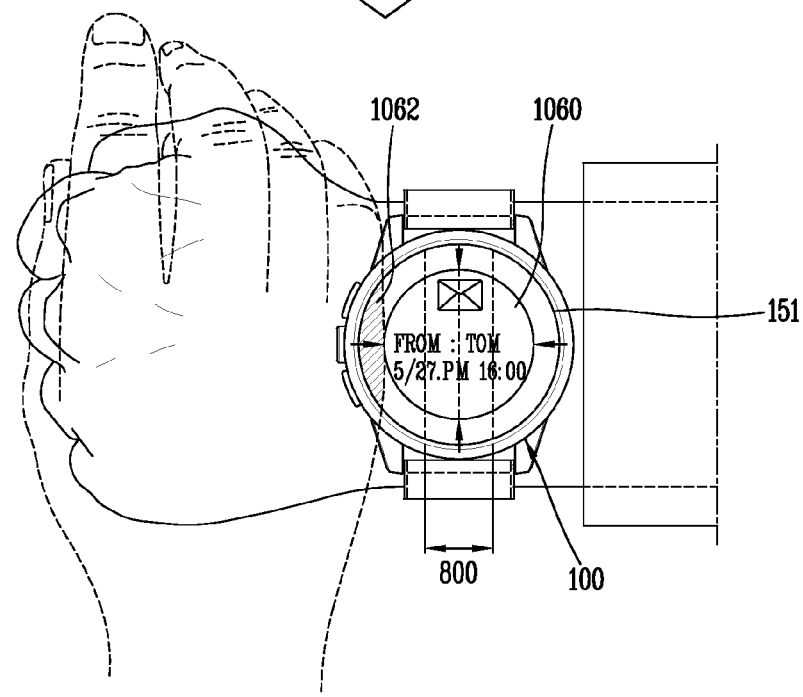

FIGS. 10A and 10B are exemplary diagrams illustrating examples in which image information is displayed at different positions on the basis of a direction in which the display unit is covered, in the smart watch according to an embodiment of the present invention.

To provide a description with reference to FIG. 10A, in the smart watch 100, as seen in FIGS. 10A (a) and (b), positions in which the first image information and the second image information are displayed are positions opposite to a direction in which an object (for example, sleeve) covering the display unit 151 is disposed.

However, for example, when a direction in which the display unit 151 is covered is changed, the control unit 180 may change a position in which the first image information or the second image information is displayed, based on the direction in which the display unit 151 is covered.

Such an example is illustrated in FIG. 10B. For example, as seen in FIGS. 10A (a) and (b), when the user indicates the left (with respect to the display unit 151 as seen in FIG. 10B) of the display unit 151 with a hand, the control unit 180 may determine a position of a first region, a position of a second region, and a position of a threshold region in a direction (a right direction of the display unit 151 as seen in FIG. 10B) opposite to a covered direction, and display image information, based on the determined positions.

That is, as seen in FIG. 10B (a), when a region 1052 in which the display unit 151 is covered by the user's hand is changed, the control unit 181 may change a position of a first region 1050, a position of a second region 1060, and a position of a threshold region 800, based on the covered region 1052.

Therefore, when the covered region 1052 includes at least one portion of the position-changed threshold region 800, the control unit 180 may display first image information in the position-changed first region 1050. Also, as seen in FIG. 10B (b), when a region 1062 covered by the user's hand does not include the position-changed threshold region 800 at all, the control unit 180 may display second image information in the position-changed second region 1060.

The smart watch 100 according to an embodiment of the present invention may control a function performed by the smart watch 100, based on a state in which the display unit 151 is covered. Here, the function performed by the smart watch 100 may be a function associated with the first image information.

Figure 11A:
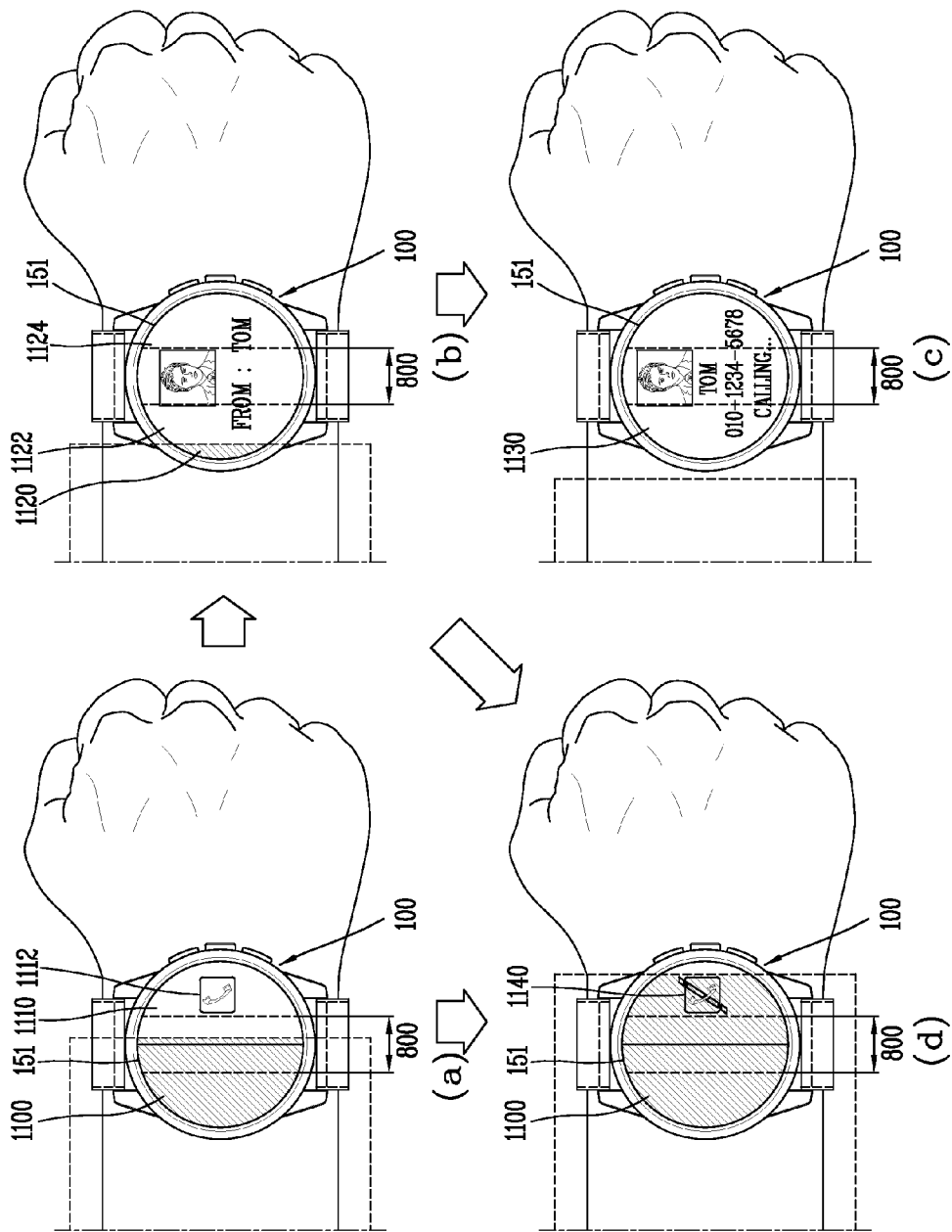
FIGS. 11A and 11B are exemplary diagrams illustrating examples in which a performed function is differently controlled based on a size of a region in which the display unit is covered, in the smart watch according to an embodiment of the present invention.

An example of such a case is illustrated in FIG. 11A.

Provide a description with reference to FIG. 11A, the smart watch 100 according to an embodiment of the present invention may provide a UI based on a state in which the display unit 151 is covered. That is, as seen FIG. 11A (a), when a region 1100 in which the display unit 151 is covered includes at least one portion of a predetermined threshold region 800, the control unit 180 may operate in a state of providing a first UI, and thus, first image information 1112 may be displayed in a first region 1110.

The first image information 1112 may be notification information associated with an event which occurs in the smart watch 100. In this case, the notification information may be relevant to various functions able to be performed by the smart watch 100. Also, when the notification information is relevant to a specific function, the control unit 180 may control a specific function associated with the notification information, based on a state in which the display unit 151 is covered.

That is, as seen in FIG. 11A (a), when the first image information 1112 is notification information that notifies the incoming of a call, the control unit 180 may allow a function associated with the incoming of the call to be performed depending on a state in which the display unit 151 is covered.

For example, in a state where the first image information 1112 including the call incoming notification information is displayed in the first region 1110, when the display unit 151 is covered by equal to or more than a predetermined level as a sensing result of a region in which the display unit 151 is covered, the control unit 180 may reject the reception of the incoming call. In this case, as seen in FIG. 11A (d), the control unit 180 may display image information 1140, associated with a function of rejecting the incoming call, in a first region. Alternatively, the control unit 180 may reject the incoming call and simultaneously enter the sleep mode.

On the other hand, when a region 1120 in which the display unit 151 is covered does not include the predetermined threshold region 800 at all as a sensing result of a region in which the display unit 151 is covered, the control unit 180 may switch to a state in which a second UI is provided. Therefore, as seen in FIG. 11A (b), second image information 1124 may be displayed in a predetermined second region 1122 of the display unit 151.

The second image information 1124 may further include additional information associated with the first image information 1112. Therefore, as seen in FIG. 11A (b), when the first image information 1112 is information associated with the incoming call, information associated with a sender of the call may be further displayed in the second region 1122 of the display unit 151. Also, in a state where the second image information 1124 is displayed, when there is the user's selection for the second image information 1124 (for example, when there is a touch input), the control unit 180 may allow a relevant function, namely, a call function, to be immediately performed.

In this state, when a region in which the display unit 151 is covered is changed, the control unit 180 may allow different functions to be performed based on the changed region. For example, as seen in FIG. 11A (c), when the entire region of the display unit 151 is exposed, the control unit 180 may perform a function (i.e., the call function) associated with the incoming call. On the other hand, as seen in FIG. 11A (d), when the display unit 151 is covered by equal to or more than a predetermined level, the control unit 180 may reject the reception of the incoming call. Therefore, in this case, the user may check a sender by using second image information 1124, and perform a function associated with the incoming of the call by further rolling up sleeve or further covering the smart watch 100.

Hereinabove, it has been described that the second image information may include information about various relevant functions, in addition to additional information associated with the first image information. In this case, as seen in FIG. 11A (b), the control unit 180 may further display information about a relevant function, namely, an incoming call-related function, in the displayed second image information 1124.

For example, when the first image information is notification information about the incoming call, the control unit 180 may further display, as the second image information relevant thereto, information about a call function, a call recording function, a text message function, or a call rejecting or postponing function. In this case, the information associated with the relevant functions may be further displayed as a graphics object such as an icon in the second image information, and the user may select at least one of a plurality of the graphics objects to allow a relevant function to be performed.

The first image information displayed in the first region may display information about various functions which are currently performed in the smart watch 100, in addition to information about an event which occurs in the smart watch 100. Also, the first image information may include a plurality of graphics objects suitable to manipulate the functions in a limited display region, namely, the first region. For example, the graphics objects may be displayed near a region, in which the display unit 151 is covered, or near an outer border of the display unit 151 in the first region, and the control unit 180 may allow various functions to be performed based on the user's touch drag input for the graphics object.

An example of such a case is illustrated in FIG. 11A.

Figure 11B:
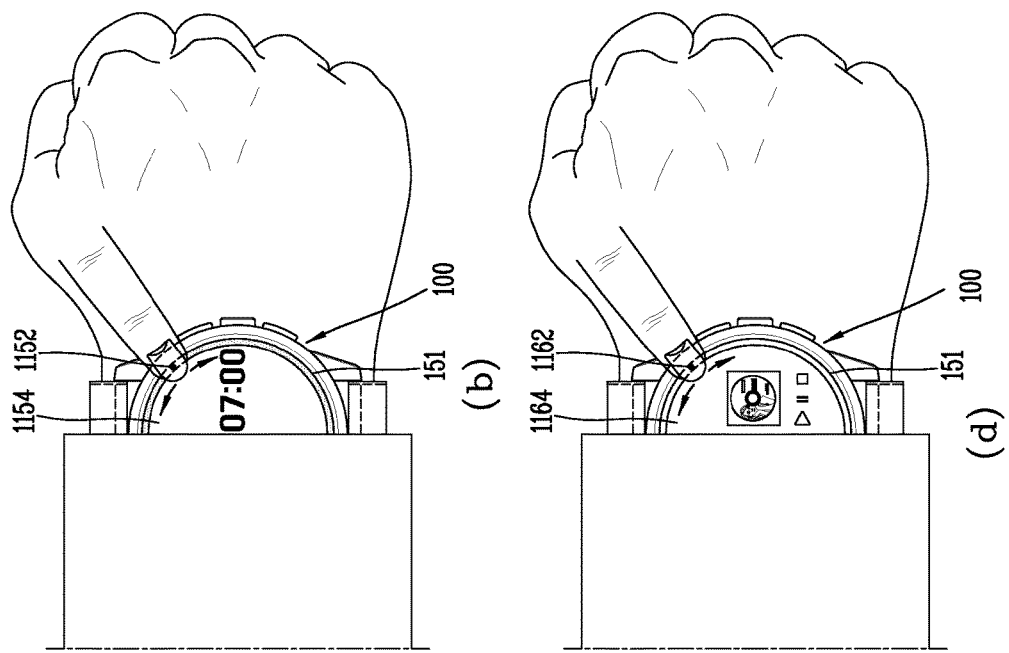

For example, as seen in FIG. 11B (a), in the smart watch 100 according to an embodiment of the present invention, in a state where an alarm function is performed, when a partial region of the display unit 151 is covered by sleeve or the like (a case of including at least portion of a predetermined threshold region), the control unit 180 may operate in a state where a first UI for the alarm function is provided. The first UI for the alarm function may include a function which enables the user to more easily adjust the alarm function in the first region 1154.

That is, as seen in FIG. 11B (b), the first UI for the alarm function may include a region 1152 which enables the user to input a touch drag to at least one portion of the first region, and allow a currently set alarm time to be changed based on the user's touch drag input for the region.

Alternatively, as seen in FIG. 11B (c), when the smart watch 100 is performing a function of reproducing a music, in a case where a partial region of the display unit 151 is covered by sleeve or the like (a case of including at least portion of a predetermined threshold region), the control unit 180 may operate in a state where a first UI including functions for the music reproducing function is provided.

That is, as seen in FIG. 11B (b), the first UI associated with the music reproducing function may include a region which enables the user to apply a touch drag input to near the outer border of the display unit 151 in a first region 1164. The smart watch 100 may provide a function which adjusts a reproduction speed of a currently reproduced music or selects a specific music according to the user's touch drag input for the formed region.

Hereinabove, the alarm function or the music reproducing function has been described as an example, but the present invention is not limited thereto. For example, a first UI for other various functions may be provided.

Hereinabove, a case in which one piece of notification information is generated in the smart watch 100 has been described as an example, but the present invention is not limited thereto. For example, the present invention may be applied to a case in which pieces of notification information are generated. That is, when pieces of notification information are generated, the control unit 180 of the smart watch 100 according to an embodiment of the present invention may display first image information about the generated pieces of notification in a first region, based on a region in which the display unit 151 is covered, or may display pieces of detailed information about the pieces of notification information in a second region. To this end, the control unit 180 may divide each of the first and second regions into a plurality of regions. Pieces of information, in which specific notification information is checked by the user or is no longer needed to be notified, may no longer be displayed in the first region or the second region (for example, in a case where a battery is charged while notification information for notifying the lack of the battery is being displayed). In this case, the control unit 180 may divide each of the first and second regions into a plurality of regions so as to correspond to the number of pieces of remaining alarm information, and different pieces of alarm information may be respectively displayed in the divided regions.

The effects of the wearable device and the method of driving the same according to an embodiment of the present invention will now be described.

According to at least one of the embodiments of the present invention, a specific UI is maintained when a region in which the wearable device is covered is changed within a certain range, and thus, a UI is not unnecessarily changed.

Moreover, according to at least one of the embodiments of the present invention, a UI in which different pieces of image information are provided is provided based on a region in which the wearable device is covered, and thus, more suitable image information is displayed depending on a state in which the wearable device is covered.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the wearable device.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable device comprising:
a wearable device body;
a display unit provided in the wearable device body;
a sensing unit included in the wearable device body, and configured to sense a region, in which the display unit is covered by an object, and a region in which the display unit is not covered; and
a control unit configured to display first image information in a predetermined first region when the region in which the display unit is not covered corresponds to the predetermined first region, and display second image information including information associated with the first image information in a predetermined second region when the region in which the display unit is not covered corresponds to the predetermined second region, as a result in which a portion of the display unit is covered by the object,
wherein the control unit is further configured to:
maintain a state in which the first image information is displayed in the predetermined first region when the region in which the display unit is covered is changed in a state where the first image information is displayed in the predetermined first region and the region in which the display unit is covered includes at least one portion of a predetermined threshold region,
when a predetermined condition is satisfied,
determine a size and a position of the predetermined threshold region,
measure the region, in which the display unit is covered, in units of a certain time for a predetermined time,
calculate an average region of a plurality of regions which include an entirety of a predetermined region and an average region of a plurality of regions which do not include the entirety of the predetermined region, among a plurality of the measured regions, and
reset the predetermined threshold region, based on region limits of the average regions, and
wherein the control unit determines the size of the position of the predetermined threshold region, based on a result in which the size of the region where the display unit is covered is measured for a predetermined time, and
the predetermined condition comprises a case, in which a region of the display unit having a predetermined size or more is continuously covered for a certain time or more, or a case in which a frequency number, in which a size of the region where the display unit is covered is changed by equal to or more than a certain level, is equal to or more than predetermined number of times or there is a user's selection.

2. The wearable device of claim 1, wherein when a specific event predetermined by the user occurs, or a specific function predetermined by the user is performed, the control unit determines there to be the user's selection.

3. The wearable device of claim 1, wherein the control unit
measures the region, in which the display unit is covered, in units of a certain time for the predetermined time, calculates an average region of a plurality of the measured regions, and sets the predetermined threshold region with respect to a region limit of the average region.

4. The wearable device of claim 1, wherein the control unit further determines a motion state of the user, based on a position movement state of the wearable device body, and adjusts the size of the predetermined threshold region, based on the determined motion state of the user.

5. The wearable device of claim 4, wherein,
as number of motions of the user increases, the control unit allows the size of the predetermined threshold region to further increase, based on a determination result of the motion state, and
the size of the predetermined threshold region is adjusted with respect to a reference line which is predetermined in the predetermined threshold region.

6. The wearable device of claim 1, wherein the control unit further determines a posture of the user, based on a result in which a horizontal state of the wearable device body is sensed, and adjusts the size of the predetermined threshold region, based on the determined posture of the user.

7. The wearable device of claim 1, wherein the second region is a larger-size region which includes the predetermined first region.

8. The wearable device of claim 1, wherein based on a sensing result of the region in which the display unit is covered, when the covered region does not include the predetermined threshold region, the control unit displays the second image information in the display unit.

9. The wearable device of claim 1, wherein when the display unit is covered by equal to or more than a predetermined level, the control unit enters a sleep mode in which an entire region of the display unit switches to an inactive state.

10. The wearable device of claim 9, wherein in the sleep mode, when the region in which the display unit is covered is changed, the control unit displays the first image information in the predetermined first region, and displays the second image information in the predetermined second region, based on a user's selection for the first image information.

11. The wearable device of claim 9, wherein,
the first image information comprises notification information for displaying an event which occurs in the wearable device, and
the second image information comprises information about various functions which are associated with the event and are able to be performed in the wearable device.

12. The wearable device of claim 11, wherein when there is a user's touch input for image information which is displayed in the predetermined second region, the control unit performs a function associated with the notification information.

13. The wearable device of claim 11, wherein in a state of performing a function associated with the notification information, when the region in which the display unit is covered is changed, the control unit controls performing of the function associated with the notification information, based on the size of the region in which the display unit is covered.

14. The wearable device of claim 1, wherein the control unit maintains, in an inactive state, a region of the display unit other than the predetermined first region or the predetermined second region.

15. The wearable device of claim 1, wherein when the display unit is covered by the object which is located within a predetermined distance, the control unit senses a covered region.

16. The wearable device of claim 1, wherein the control unit determines a position of the predetermined first region, and a position of the predetermined second region, based on a direction of the region in which the display unit is covered.

17. A method of controlling a wearable device, the method comprising:
detecting a region in which a display unit provided in the wearable device is covered by an object;
displaying first image information in a predetermined first region or displaying second image information including information associated with the first image information in a predetermined second region, based on the detected region;
sensing a change of the region in which the display unit is covered;
when the covered region is changed, determining whether the changed region includes at least one portion of a predetermined threshold region; and
maintaining a state in which image information is currently displayed, or switching to a state in which other image information is displayed in another region, according to whether the changed region includes the at least one portion of the predetermined threshold region,
wherein when a predetermined condition is satisfied:
determining a size and a position of the predetermined threshold region;
measuring the region, in which the display unit is covered, in units of a certain time for a predetermined time;
calculating an average region of a plurality of regions which include an entirety of a predetermined region and an average region of a plurality of regions which do not include the entirety of the predetermined region, among a plurality of the measured regions; and
resetting the predetermined threshold region, based on region limits of the average regions,
wherein the method further comprises determining the size of the position of the predetermined threshold region, based on a result in which the size of the region where the display unit is covered is measured for the predetermined time, and
the predetermined condition comprises a case, in which a region of the display unit having a predetermined size or more is continuously covered for a certain time or more, or a case in which a frequency number, in which a size of the region where the display unit is covered is changed by equal to or more than a certain level, is equal to or more than predetermined number of times or a case in which there is a user's selection.

* * * * *